(12) United States Patent  (10) Patent No.: US 9,106,014 B2
Ohmura  (45) Date of Patent: Aug. 11, 2015

(54) ELECTRICAL CONNECTOR

(71) Applicant: YAZAKI CORPORATION, Minato-ku, Tokyo (JP)

(72) Inventor: Takenori Ohmura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/328,080

(22) Filed: Jul. 10, 2014

(65) Prior Publication Data

US 2014/0322952 A1  Oct. 30, 2014

Related U.S. Application Data

(63) Continuation of application No. PCT/JP2012/008112, filed on Dec. 19, 2012.

(30) Foreign Application Priority Data

Jan. 17, 2012  (JP) .................. 2012-007304

(51) Int. Cl.
*H01R 13/627* (2006.01)
*H01R 13/633* (2006.01)
*H01R 13/641* (2006.01)
*B60L 11/18* (2006.01)

(52) U.S. Cl.
CPC ........ *H01R 13/6272* (2013.01); *B60L 11/1818* (2013.01); *H01R 13/6275* (2013.01); *H01R 13/633* (2013.01); *H01R 13/641* (2013.01); *B60L 2270/32* (2013.01); *B60L 2270/34* (2013.01); *Y02T 10/7005* (2013.01); *Y02T 90/14* (2013.01)

(58) Field of Classification Search
CPC ............. H01R 2201/26; H01R 13/502; H01R 13/6275; H01R 13/5825; H01R 13/6272; H01R 13/6276; H01R 13/6397; H01R 13/111; H01R 13/504; H01R 13/512; H01R 13/521; H01R 13/53; H01R 13/6271; H01R 13/62933; H01R 13/631; H01R 13/635; H01R 13/06
USPC ............................ 439/34, 310, 352, 595, 589
See application file for complete search history.

(56) References Cited

U.S. PATENT DOCUMENTS

| 5,433,623 | A | * | 7/1995 | Wakata et al. ................. 439/310 |
| 5,458,496 | A |   | 10/1995 | Itou et al. |
| 5,556,284 | A |   | 9/1996 | Itou et al. |
| 5,558,533 | A |   | 9/1996 | Hashizawa et al. |
| 5,573,417 | A |   | 11/1996 | Hashizawa et al. |
| 5,577,920 | A |   | 11/1996 | Itou et al. |

(Continued)

FOREIGN PATENT DOCUMENTS

| EP | 0634818 A2 | 1/1995 |
| JP | H06-236780 A | 8/1994 |
| JP | H10-275653 A | 10/1998 |

*Primary Examiner* — Briggitte R Hammond
(74) *Attorney, Agent, or Firm* — Marvin A. Motsenbocker; Mots Law, PLLC

(57) ABSTRACT

In an electrical connector, a latch claw is provided at a nearer side than a lock claw in a fitting direction of a connector fitting portion to a power receiving connector. While the latch claw is retracted into the connector fitting portion, the latch arm swings to release the latching between a latch piece and a second latch groove portion. The latch arm includes a protrusion 131A that releases the latching between the second latch groove portion and a hold latch piece of the lock-release hold portion when the second latch groove portion and the latch piece latch together.

4 Claims, 26 Drawing Sheets

(56) References Cited

U.S. PATENT DOCUMENTS

| | | |
|---|---|---|
| 5,637,977 A * | 6/1997 | Saito et al. .................... 320/109 |
| 5,639,256 A | 6/1997 | Endo et al. |
| 5,674,086 A | 10/1997 | Hashizawa et al. |
| 5,816,643 A | 10/1998 | Itou et al. |
| 5,906,500 A * | 5/1999 | Kakuta et al. ................. 439/310 |
| 8,025,526 B1 * | 9/2011 | Tormey et al. ................. 439/528 |
| 2009/0159414 A1 * | 6/2009 | Matsumoto et al. .......... 200/335 |
| 2011/0230094 A1 * | 9/2011 | Takada .......................... 439/589 |

* cited by examiner

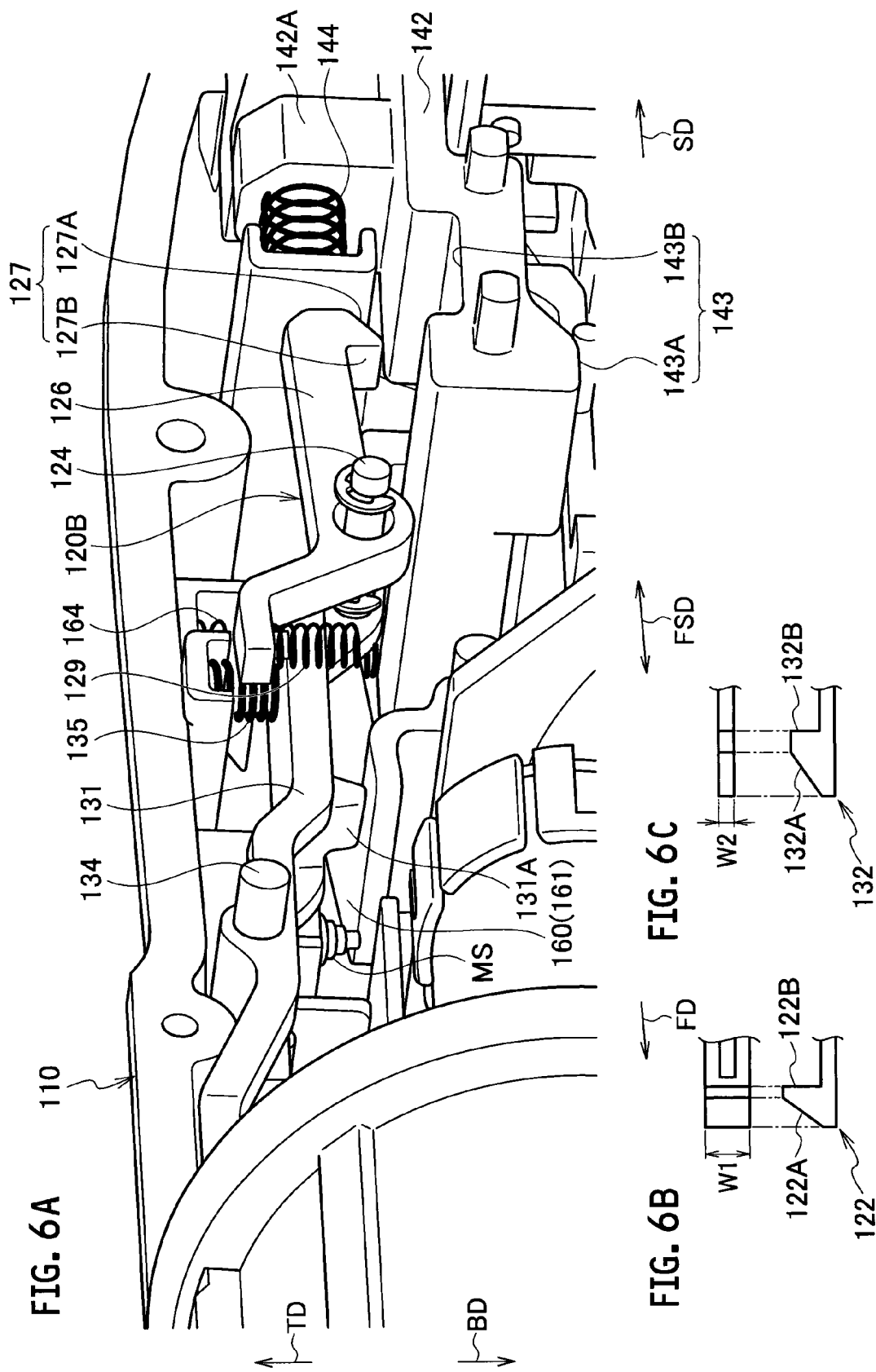

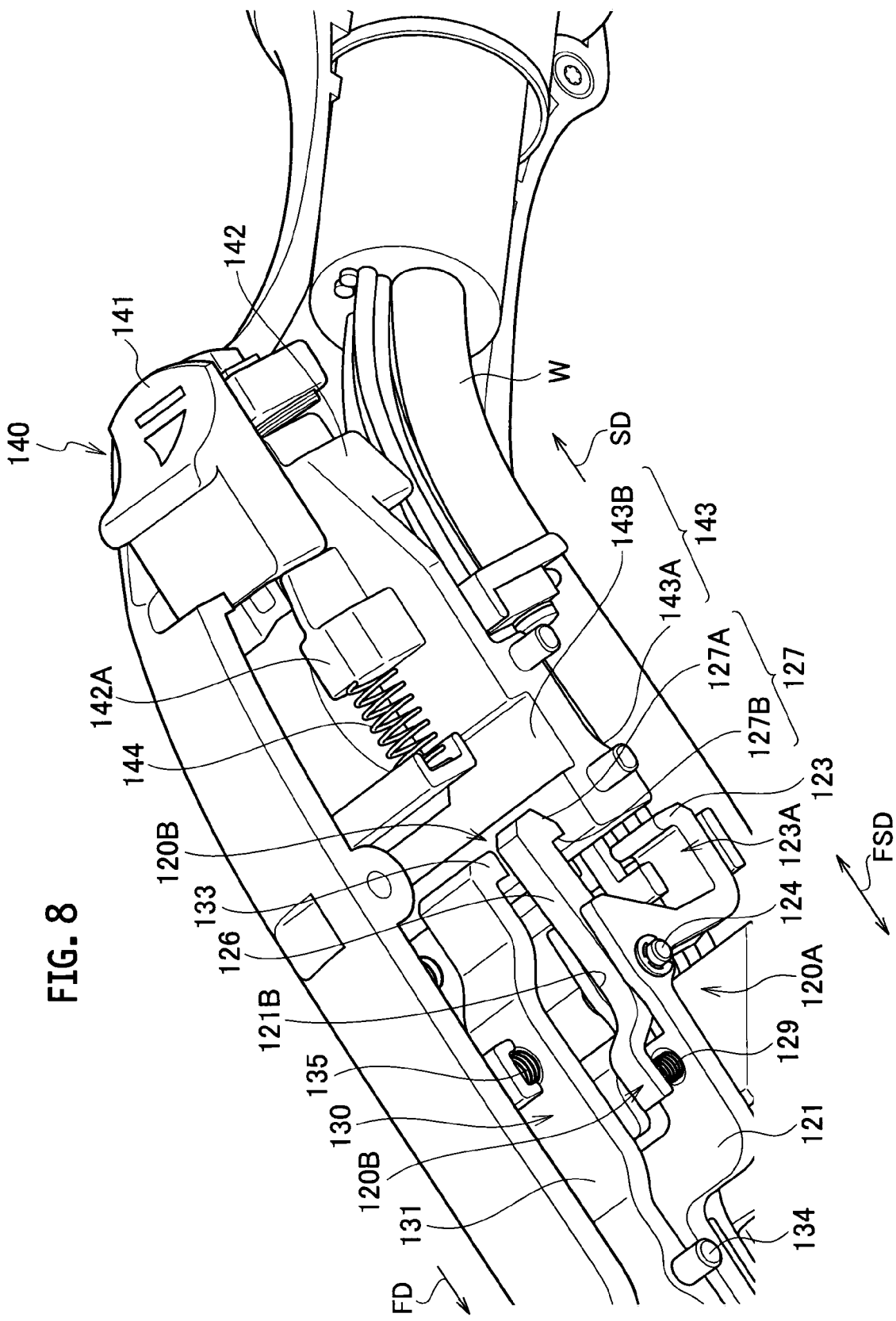

ELECTRICAL CONNECTOR

CROSS REFERENCE TO RELATED APPLICATIONS

This application is a continuation application of International Application No. PCT/JP2012/008112, filed on Dec. 19, 2012, which claims priority to Japanese Patent Application No. 2012-007304, filed on Jan. 17, 2012, the entire contents of which are incorporated by references herein.

BACKGROUND OF THE INVENTION

1. Field of the Invention

The present invention relates to an electrical connector that is used to charge a battery mounted on a vehicle such as an electric vehicle or a hybrid electric vehicle.

2. Description of the Related Art

An electrical connector is used to charge a battery mounted on a vehicle such as an electric vehicle (EV) or a hybrid electric vehicle (HEV). Specifically, as illustrated in FIG. 1, an electrical connector 200 is fittable to a power receiving connector 300 provided with a power receiving terminal 301, and includes a power feeding terminal 211 that is connected to the power receiving terminal 301 when the electrical connector 200 is in a state of fitting to the power receiving connector 300.

The electrical connector 200 includes a connector fitting portion 210 that is provided with the power feeding terminal 211 therein and fits to the power receiving connector 300, and a connector case 220 that accommodates an electric wire W connected to the power feeding terminal 211.

In the connector case 220, the electric wire W connected to the power feeding terminal 211 inside the connector fitting portion 210 extends through a handle portion 221 to the outside, and a slide portion 230 absorbing an expansion/contraction according to a slide operation of the power feeding terminal 211, the electric wire W, or the like is provided between the connector fitting portion 210 and the handle portion 221.

When fitting the electrical connector 200 to the power receiving connector 300, a user holds the handle portion 221 and presses the electrical connector 200 against the power receiving connector 300 to fit the connector fitting portion 210 to the power receiving connector 300. Thereafter, when the user holds the handle portion 221 and pulls (turns) a turn lever 240, the power feeding terminal 211 slides by a slide portion 230 together with the electric wire W and thus the fitting to the power receiving terminal 301 of the power receiving connector 300 is completed. At this time, the handle portion 221 also moves in a fitting direction, and the slide portion 230 absorbs the sliding amount.

The electrical connector 200 is provided with a lever lock mechanism 250 that prevents the turn lever 240 from turning while the power feeding terminal 211 and the power receiving terminal 301 are being connected together. Accordingly, the power feeding terminal 211 can be prevented from sliding in a fitting release direction while the power feeding terminal 211 and the power receiving terminal 301 are being connected together, and thus the connection between the power feeding terminal 211 and the power receiving terminal 301 can be prevented from being abruptly disconnected during the charge of a battery.

SUMMARY OF THE INVENTION

However, in the above-described related electrical connector 200, even when the connector fitting portion 210 is not in a state of completely fitting to the power receiving connector 300, the battery may be in a state of being chargeable because the slide portion 230 disposed between the connector fitting portion 210 and the handle portion 221 may contract and thus the power feeding terminal 211 may move to a fitting side together with the electric wire W.

That is, since the electrical connector 200 cannot detect whether the power receiving connector 300 and the connector fitting portion 210 completely fit to each other, the battery may be charged while the power receiving connector 300 and the connector fitting portion 210 are in a state of half-fitting together.

An object of the present invention is to provide an electrical connector that can detect a fitting state between a power receiving connector and a connector fitting portion and thus can improve safety more securely.

An electrical connector in accordance with some embodiments includes: a connector case configured to accommodate an electric wire, the connector case including a connector fitting portion configured to fit to a power receiving connector and configured to accommodate a power feeding terminal connected to the electric wire; a lock mechanism configured to prevent the power receiving connector and the connector fitting portion from being separated from each other in the fitting state between the power receiving connector and the connector fitting portion; a fitting detecting mechanism configured to detect the fitting state between the power receiving connector and the connector fitting portion; a lock release unit including an operating portion advanceable from and retreatable to the connector case, and a latch portion configured to latch to a portion of the lock mechanism and a portion of the fitting detecting mechanism with the operating portion being retreated to the connector case; and a lock-release hold portion configured to hold the operating portion of the lock release unit when the operating portion is in a state of being pressed. Upon release of the latching of the latch portion in the fitting state between the power receiving connector and the connector fitting portion, the operating portion of the lock release unit is configured to move in a direction where the operating portion advances from the connector case and become operatable to enable release of the fitting state between the power receiving connector and the connector fitting portion. The lock mechanism includes a lock arm swingably provided in the connector case, a lock claw provided at one end of the lock arm at a side of the power receiving connector and being protrudable and retractable from the connector fitting portion, and a lock piece provided at the other end of the lock arm and being latchable to the latch portion of the lock release unit. The fitting detecting mechanism includes a latch arm swingably provided in the connector case, a latch claw provided at one end of the latch arm at a side of the power receiving connector and being protrudable and retractable from the connector fitting portion, and a latch piece provided at the other end of the latch arm and being latchable to the latch portion of the lock release unit. The latch piece is provided on a nearer side than the lock claw in a fitting direction of the connector fitting portion to the power receiving connector, and while the latch claw is in a state of retracting into the connector fitting portion, the latch arm swings, so that the latching of the latch piece to the lock release unit is released. The lock-release hold portion includes a hold arm swingably provided in the connector case, and a hold latch piece provided at an end portion of the hold arm, the hold latch piece being latched to the latch portion of the lock release unit at a position where the operating portion of the lock release unit is pressed. The latch arm includes a latch state release portion configured to release latching between the hold latch piece and the latch piece when the latch piece of the lock release unit and the latch piece latch together.

According to the above configuration, the latch claw is provided on the nearer side than the lock claw in the fitting direction of the connector fitting portion to the power receiving connector, and the latch arm swings to release the latching between the latch piece and the lock release unit while the latch claw is retracted into the connector fitting portion. Accordingly, the latch claw is retracted into the connector fitting portion by the abutting on the power receiving connector to be later than the lock claw. Therefore, the latching between the latch piece and the latch portion of the lock release unit by the swing of the latch arm is not released unless the latching between the lock piece and the latch portion of the lock release unit by the swing of the lock arm is released.

That is, when only the latching between the lock piece and the latch portion of the lock release unit is released, the power receiving connector and the connector fitting portion are not in a state of completely fitting together and thus the operating portion of the lock release unit does not protrude from the connector case and is yet unoperatable. On the other hand, when the latching between the lock piece and the latch portion of the lock release unit is released and also the latching between the latch piece and the latch portion of the lock release unit is released, the power receiving connector and the connector fitting portion are in a state of completely fitting together and thus the operating portion of the lock release unit protrudes from the connector case and becomes operable. Accordingly, the fitting state between the power receiving connector and the connector fitting portion can be detected according to the positional state of the operating portion of the lock release unit. Therefore, the battery can be prevented from being charged in the half-fitting state, thus making it possible to improve stability more securely.

In addition, the electrical connector further includes the lock-release hold portion which holds the operating portion of the lock release unit when the operating portion is in a state of being pressed. Accordingly, even when the operating portion of the lock release unit is not continuously pressed in the fitting direction, the operating portion of the lock release unit does not protrude from the connector case and can be held in an unoperatable state. Therefore, the operability is improved because an operator need not perform the operation while pressing the operating portion of the lock release unit.

In addition, the latch arm includes a latch state release portion configured to release latching between the hold latch piece and the latch portion of the lock release unit when the latch portion of the lock release unit and the latch piece latch together. That is, while the operating portion of the lock release unit does not protrude from the connector case, the latching between the hold latch piece and the latch portion of the lock release unit is released and the latch piece and the latch portion of the lock release unit are latched together. Therefore, the operating portion of the lock release unit can be prevented from accidentally protruding from the connector case when the connector fitting portion is separated from the power receiving connector.

The lock-release hold portion may further include: a hold arm shaft pivotably supporting the hold arm; and a hold arm bias member biasing the hold arm toward a direction where the hold latch piece is latched to the operating portion of the lock release unit.

The lock mechanism may include a lock arm shaft configured to pivotally support the lock arm to be swingable, and a lock arm bias member configured to bias the lock arm in a direction where the lock claw protrudes from the connector fitting portion. The fitting detecting mechanism may include a latch arm shaft configured to pivotally support the latch arm to be swingable, and a latch arm bias member configured to bias the latch arm in a direction where the latch claw protrudes from the connector fitting portion. The lock release unit may include a release bias member configured to bias the lock release unit in the direction where the operating portion advances from the connector case.

According to the above-described configuration, it is possible to provide an electrical connector that can detect a fitting state between a power receiving connector and a connector fitting portion and thus can improve safety more securely.

BRIEF DESCRIPTION OF THE DRAWINGS

FIG. 6A is an enlarged perspective view illustrating the neighborhood of a second lock unit (a lock arm is omitted herein) and a plan/side view of a lock claw and a latch claw according to the present embodiment.

FIG. 6B is a plan/side view of a lock claw according to the present embodiment.

FIG. 6C is a plan/side view of a latch claw according to the present embodiment.

FIG. 8 is an enlarged perspective view illustrating the neighborhood of a lock release unit according to the present embodiment.

DESCRIPTION OF THE PREFERRED EMBODIMENTS

Figure 1:
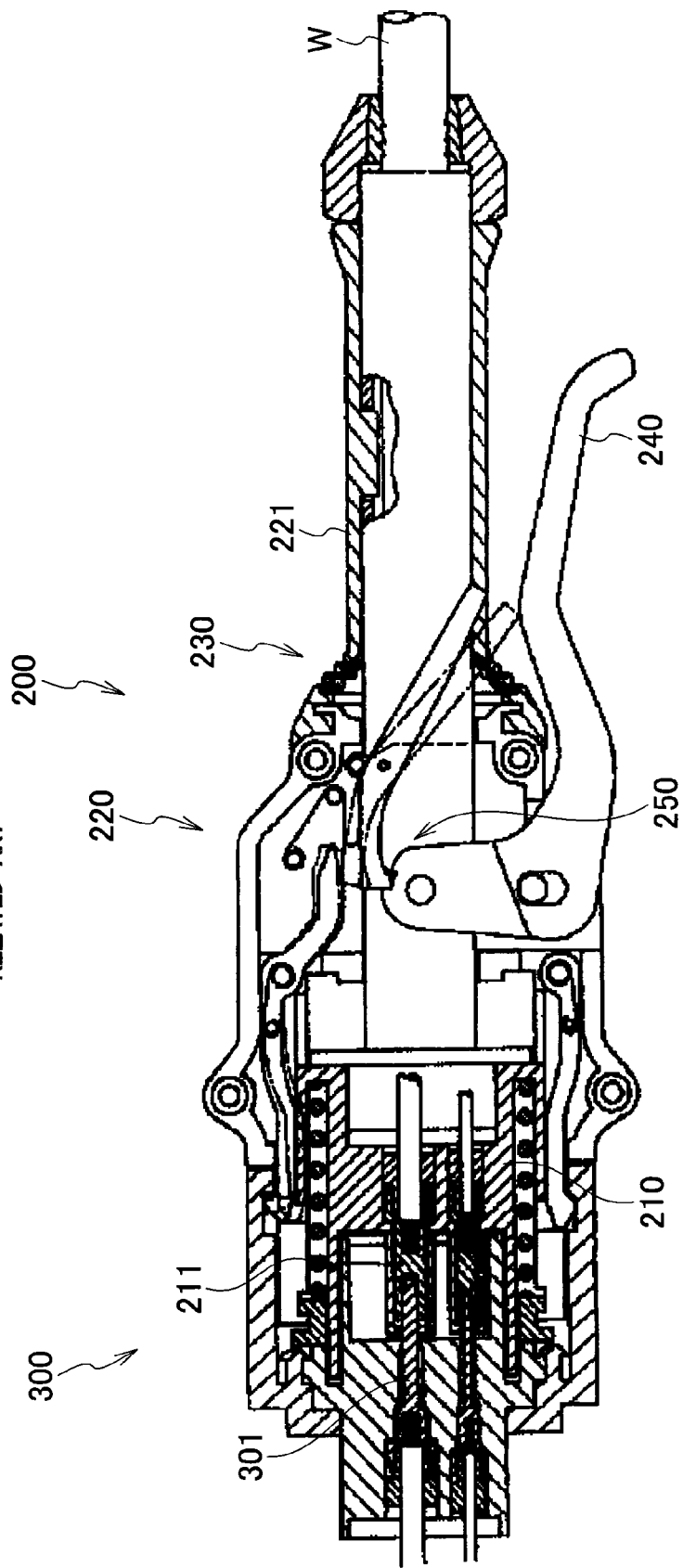
FIG. 1 is a cross-sectional view illustrating a related electrical connector.

Hereinafter, an electrical connector according to embodiments of the present invention will be described with reference to the drawings. Specifically, (1) Configuration of Electrical Connector, (2) Operation of Electrical Connector, (3) Function and Effect, and (4) Other Embodiments will be described.

Also, in the following description of the drawings, identical or similar reference numerals are given to identical or similar portions. However, it should be noted that the drawings are schematic and dimensional ratios and the like are different from actual ones.

Accordingly, specific sizes and the like should be determined in consideration of the following description. In addition, there may be some differences in dimensional relations and ratios between the mutual drawings.

(1) Configuration of Electrical Connector

First, a configuration of an electrical connector 100 according to the present embodiment will be described with reference to FIGS. 2 to 15. FIGS. 2 to 15 are views for describing a configuration of the electrical connector 100 according to the present embodiment.

Figure 2:
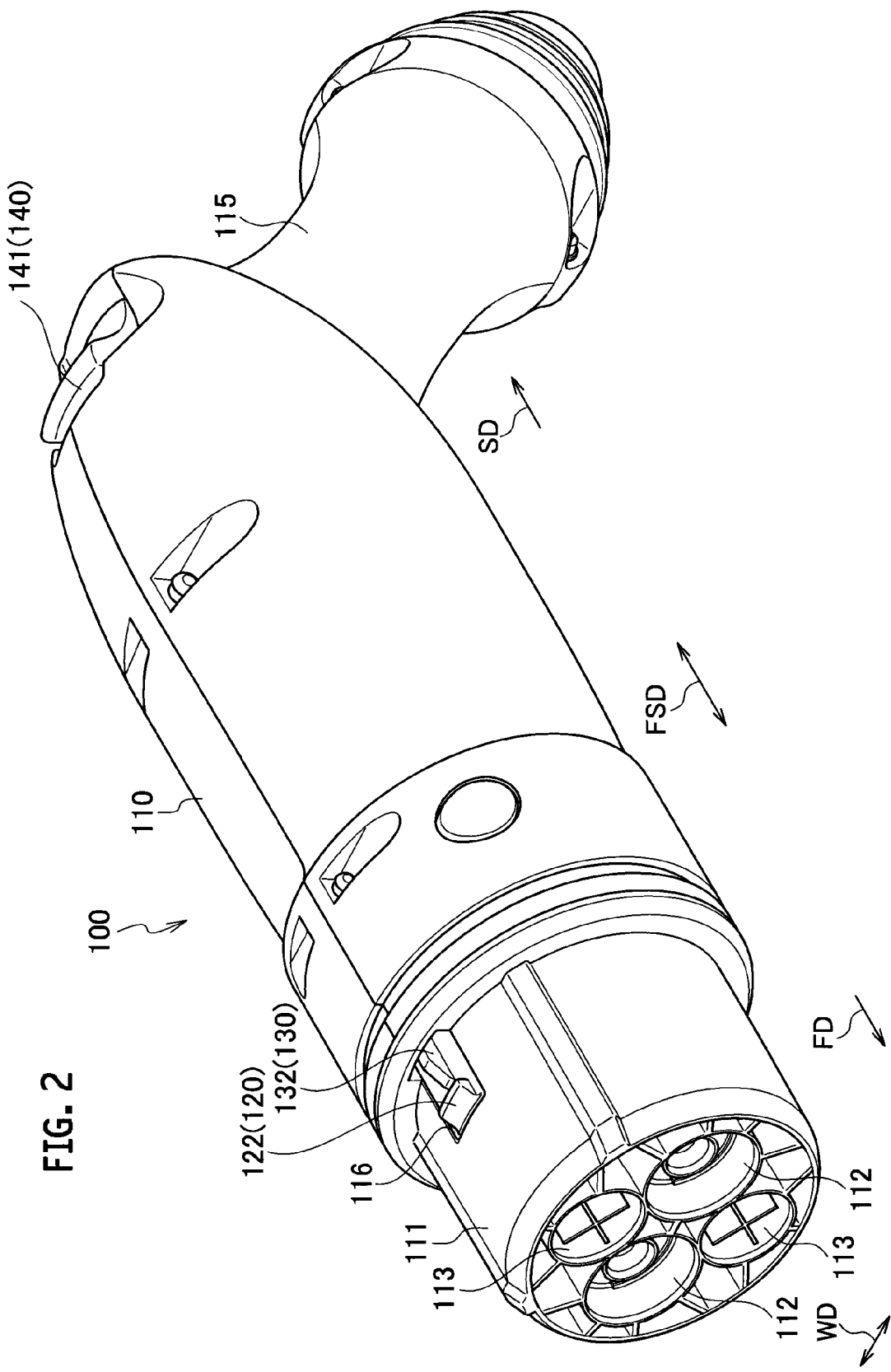
FIG. 2 is a perspective view illustrating an electrical connector according to a present embodiment.
Figure 3:
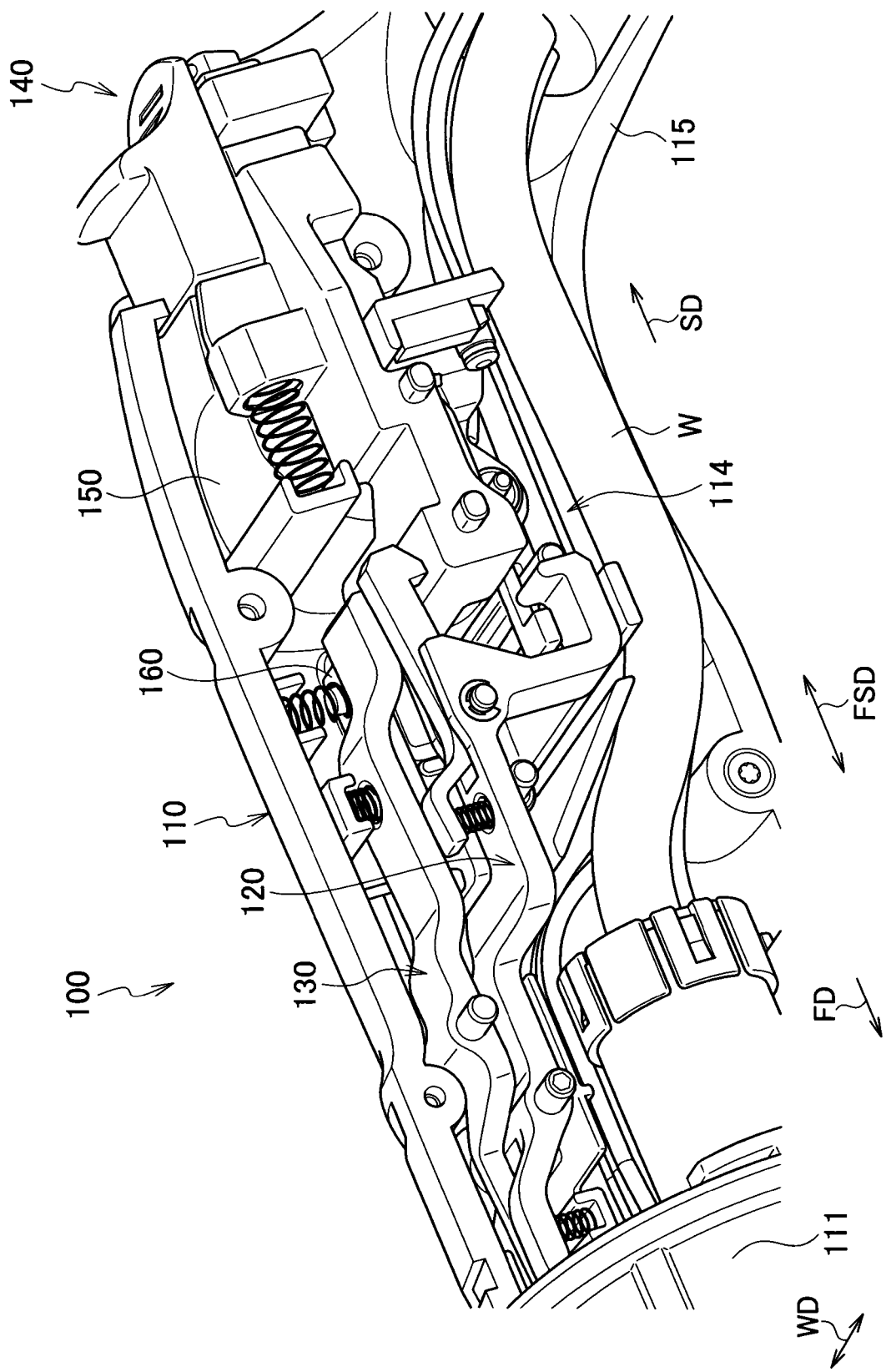
FIG. 3 is a partially exploded perspective view illustrating the electrical connector according to the present embodiment.
Figure 4:
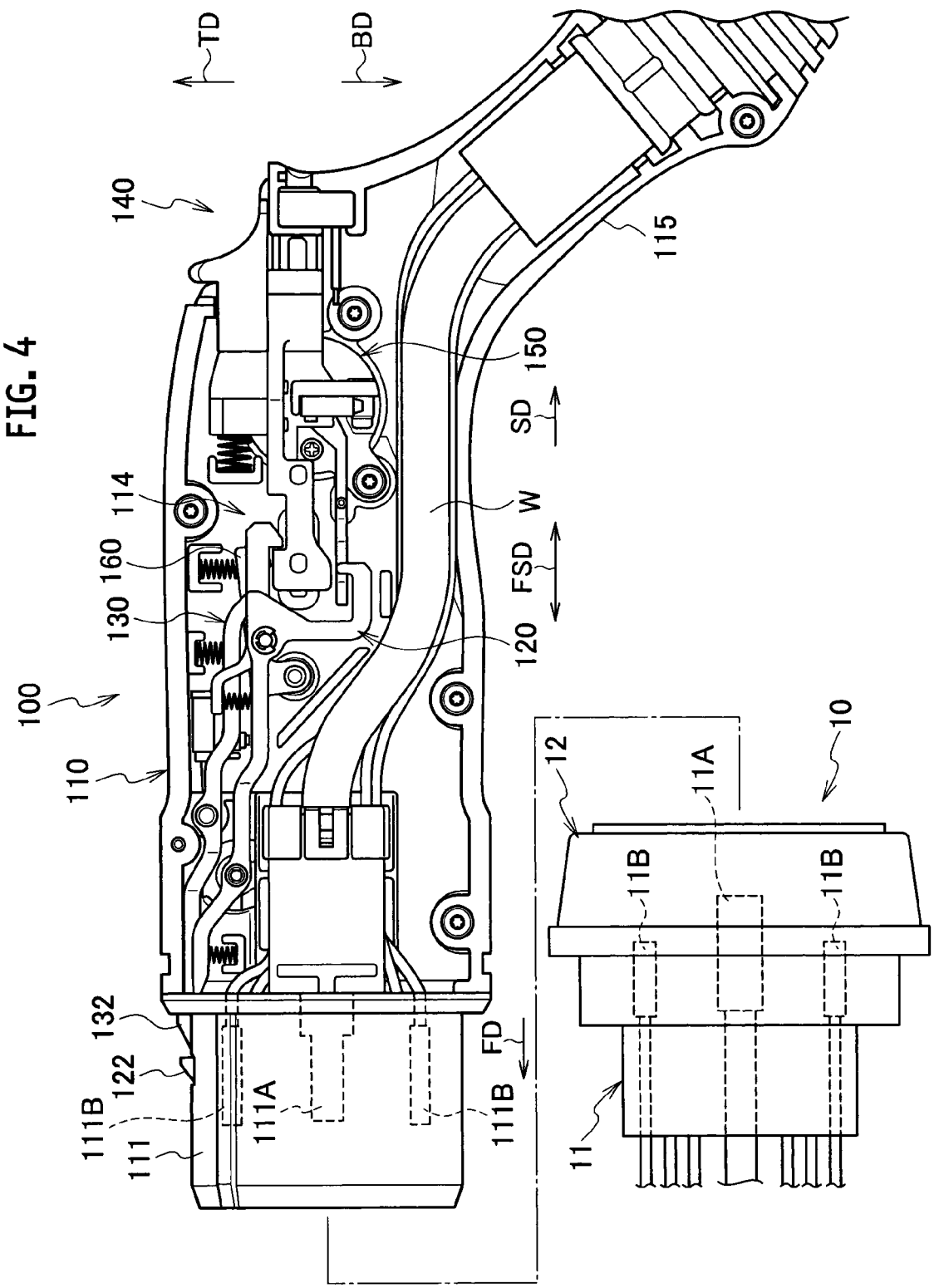
FIG. 4 is a cross-sectional view illustrating the electrical connector according to the present embodiment.

As illustrated in FIGS. 2 to 4, the electrical connector 100 is fittable to a power receiving connector 10 provided with a power receiving terminal 11A (see FIG. 4) used for power feeding, and includes a power feeding terminal 111A that is connected to the power receiving terminal 11A when the electrical connector 100 is in a state of fitting to the power receiving connector 10. As illustrated in FIG. 4, the power receiving connector 10 includes a connector housing 11 that accommodates the power receiving terminal 11A and a signal terminal 11B for a control circuit such as signaling/displaying, and a hood portion 12 that is integrated with the connector housing 11 and has an inner periphery that fits to a front end of the electrical connector 100 (an outer periphery of a connector fitting portion 111).

As illustrated in FIGS. 3 and 4, the electrical connector 100 includes a connector case 110, a lock mechanism 120, a fitting detecting mechanism 130, a lock release unit 140, a power feedability determining mechanism 150, and a lock-release hold portion 160.

(Connector Case)

Figure 5:
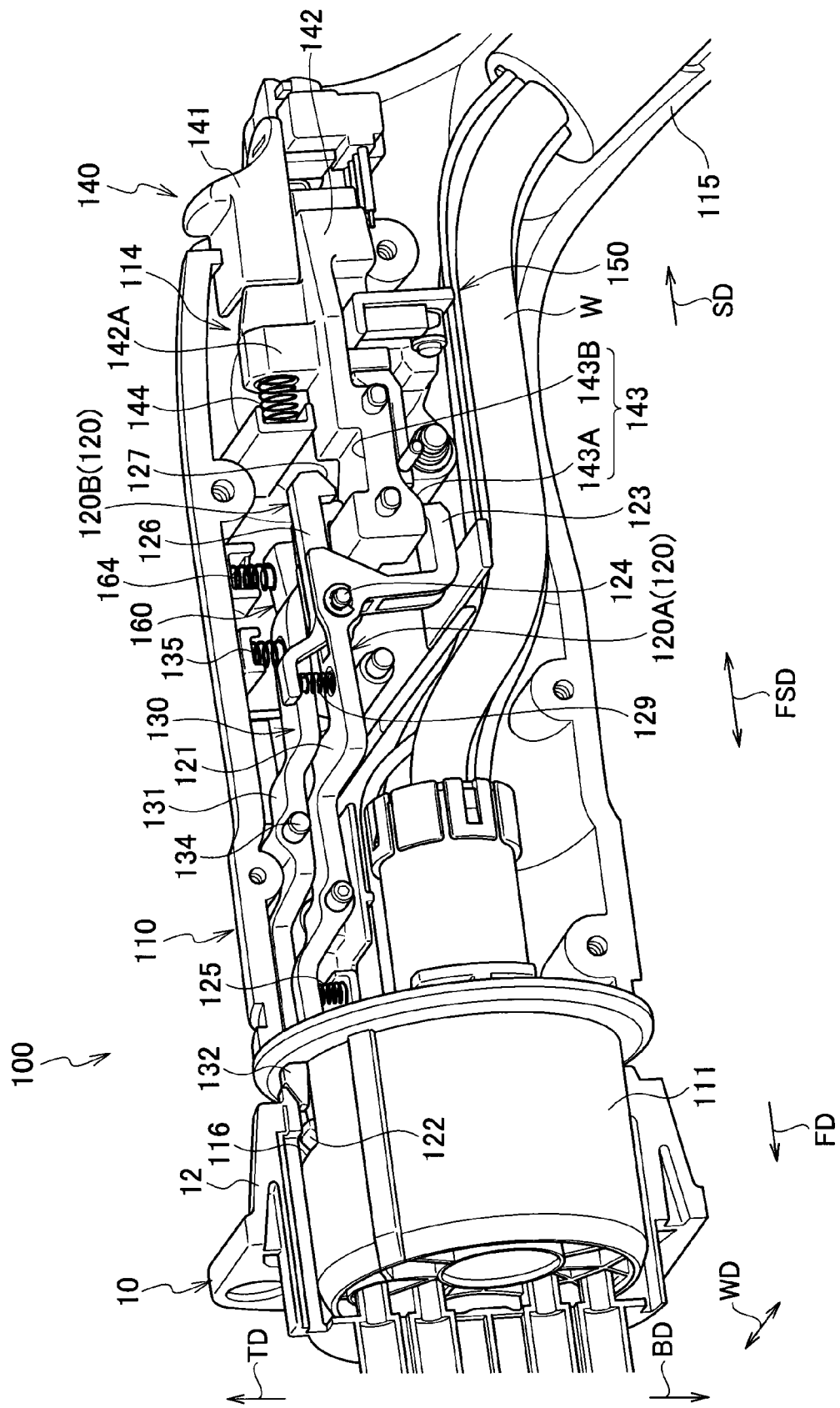
FIG. 5 is a perspective view illustrating the inside of the electrical connector according to the present embodiment.

The connector case 110 has a cylindrical shape. As illustrated in FIG. 5, the connector case 110 includes the connector fitting portion 111 that is provided with the power feeding terminal 111A therein and fits to the connector housing 11 of the power receiving connector 10, and accommodates an electric wire W connected to the power feeding terminal 111A.

A terminal receiving chamber 112 accommodating the power feeding terminal 111A is provided at the right and left sides of the connector fitting portion 111, and a composite terminal receiving chamber 113 accommodating a signal terminal 111B for a control circuit such as signaling/displaying is provided at top and bottom of the connector fitting portion 111 (see FIG. 2). The electric wire W is connected to the power feeding terminal 111A and the signal terminal 111B by pressure bonding or the like.

As illustrated in FIGS. 3 to 5, a lock chamber 114 accommodating the lock mechanism 120, the fitting detecting mechanism 130, and the lock release unit 140 is provided over the electric wire W in the connector case 110. A handle portion 115 held by an operator is provided at a rear bottom of the connector case 110, and the electric wire W extends through the handle portion 115 to the outside.

(Lock Mechanism)

The lock mechanism 120 prevents the separation between the power receiving connector 10 and the electrical connector 100 when the power receiving connector 10 and the connector fitting portion 111 are in a state of fitting together (i.e. in a fitting state where the power receiving connector 10 and the connector fitting portion 111 are fitted together). As illustrated in FIG. 5, the lock mechanism 120 includes a first lock unit 120A and a second lock unit 120B.

As illustrated in FIGS. 5 and 8 to 10, the first lock unit 120A includes a biforked lock arm 121 that is swingably provided in the connector case 110, a lock claw 122 (FIGS. 2, 4 and 5) that is provided at one end of the lock arm 121 on a power receiving connector 10 side and is protrudable/retractable from an outer periphery of the connector fitting portion 111, and a lock piece 123 that is provided at the other end of the lock arm 121 and is latchable to a latch groove portion 143 of the lock release unit 140.

The lock arm 121 is pivotally supported to be swingable by a lock arm shaft 124, and the lock claw 122 is biased by a coil spring 125 as a lock arm bias member toward a top direction TD that is a protruding direction from the outer periphery of the connector fitting portion 111.

Figure 9:
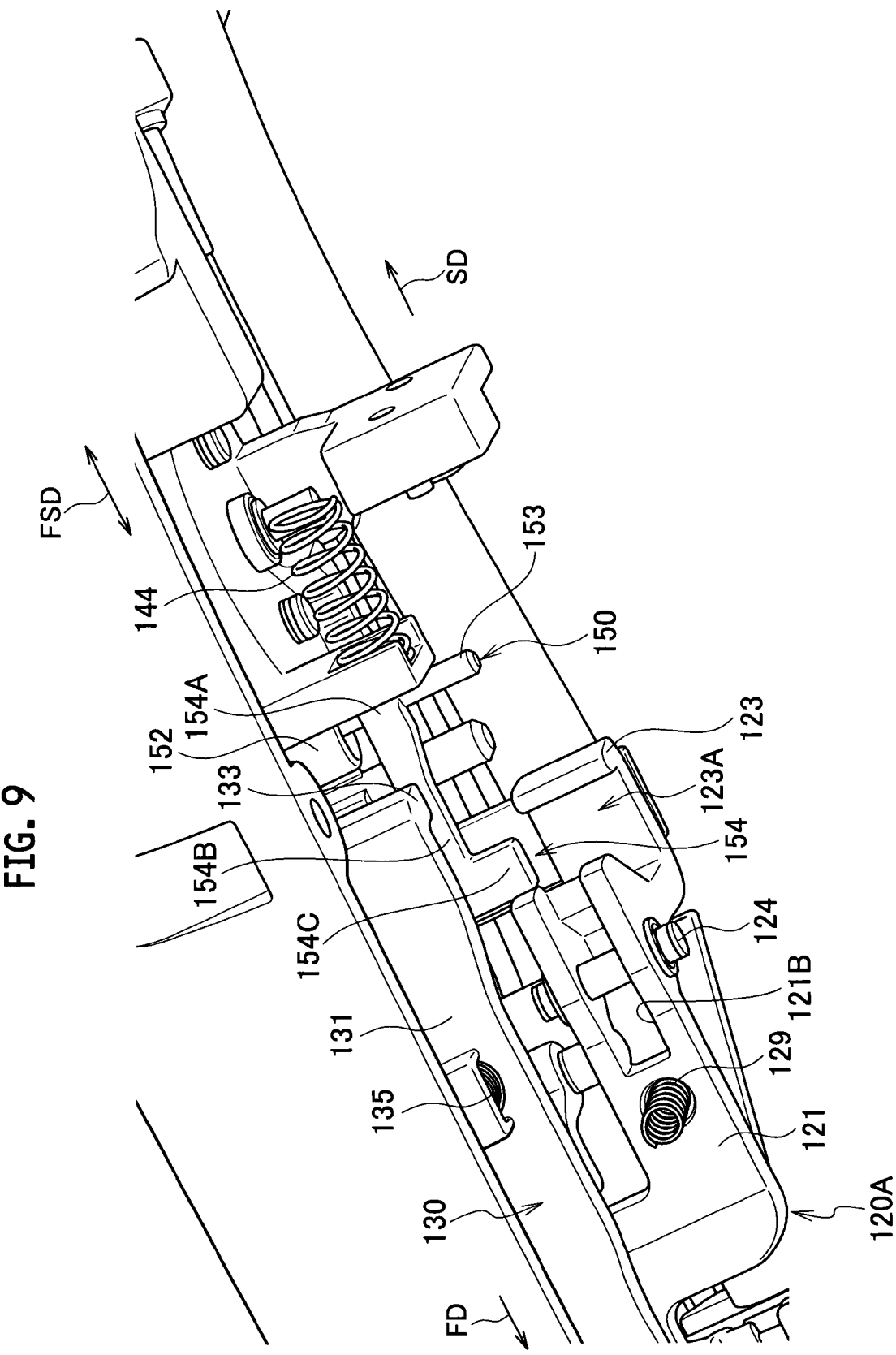
FIG. 9 is an enlarged perspective view illustrating the neighborhood of the first lock unit and a power feedability determining mechanism (the second lock unit is omitted herein) according to the present embodiment (No. 1).
Figure 10:
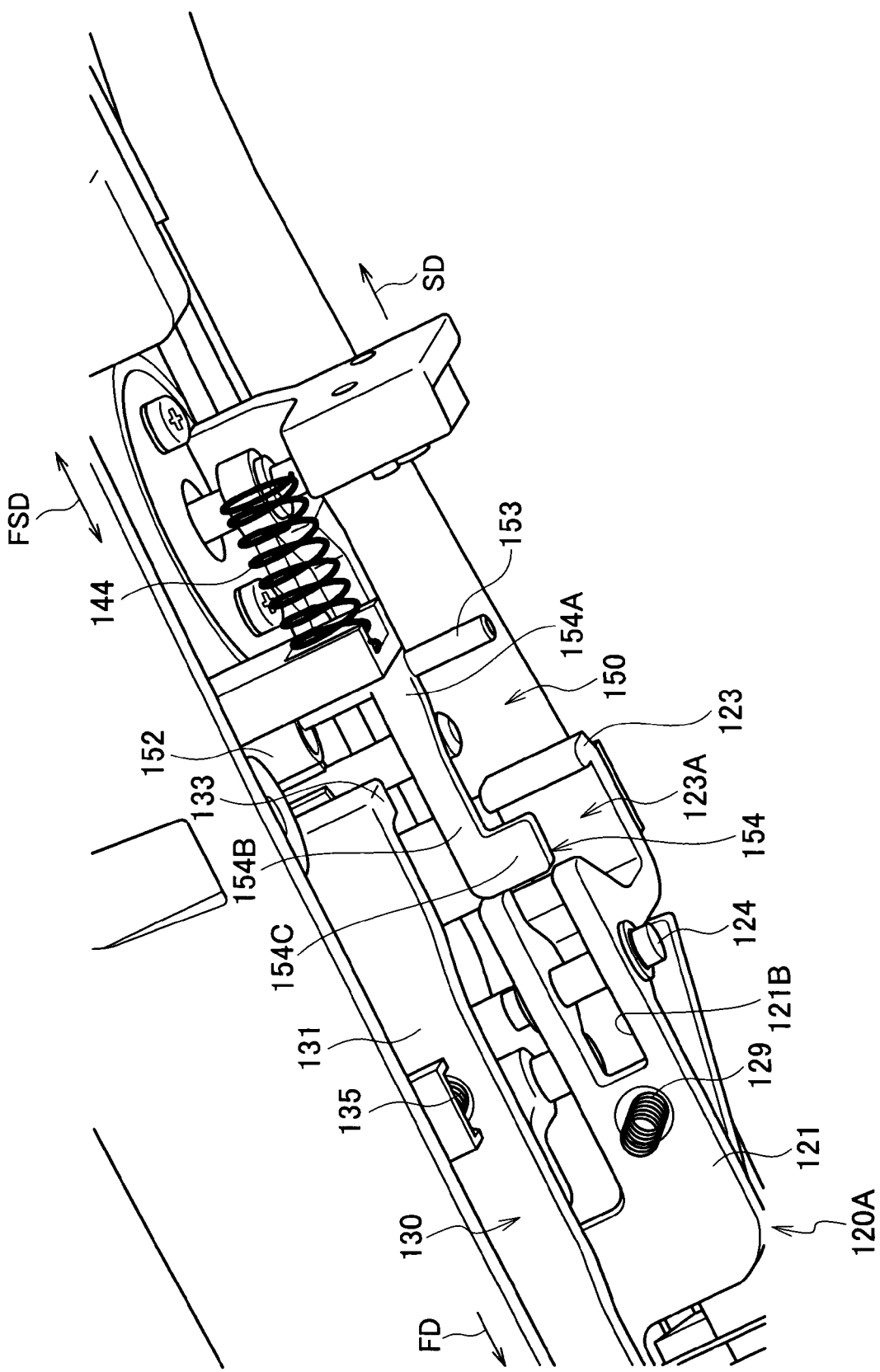
FIG. 10 is an enlarged perspective view illustrating the neighborhood of the first lock unit and the power feedability determining mechanism (the second lock unit is omitted herein) according to the present embodiment (No. 2).
Figure 11:
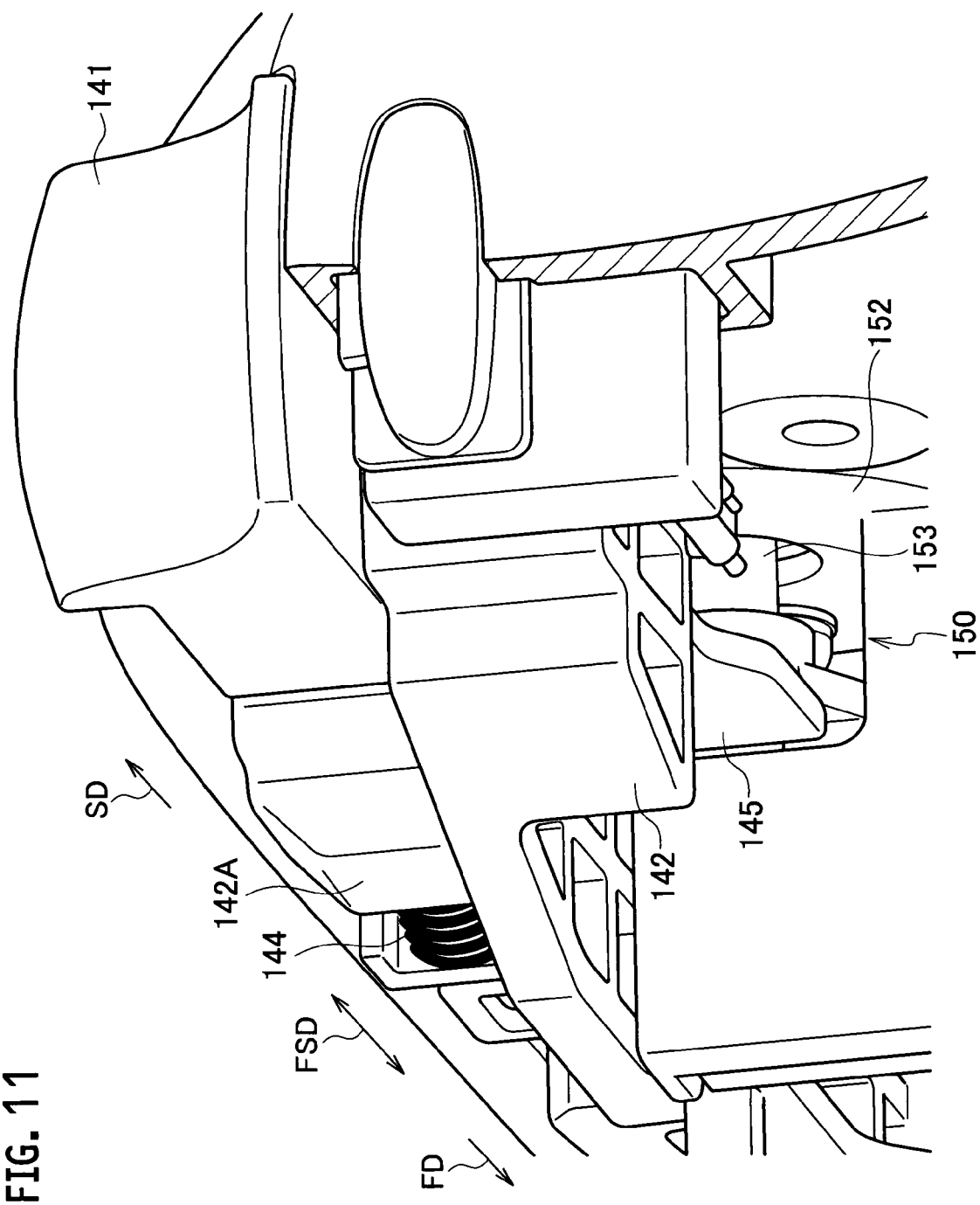
FIG. 11 is an enlarged perspective view illustrating the neighborhood of the lock release unit and the power feedability determining mechanism according to the present embodiment.

The lock arm 121 is bent at the side of the lock claw 122 from the lock arm shaft 124 in a width direction WD perpendicular to a fitting/separating direction FSD (see FIGS. 8 to 10). The lock arm 121 is bent in a bottom direction BD at the position of the lock arm shaft 124, and the lock piece 123 extends from the bent front end in the fitting/separating direction FSD (see FIGS. 5 and 8 to 10).

The fitting/separating direction FSD includes a direction of fitting the electrical connector 100 to the power receiving connector 10 (hereinafter referred to as a fitting direction FD) and a direction of separating the electrical connector 100 from the power receiving connector 10 (hereinafter referred to as a separating direction SD).

Figure 7A:
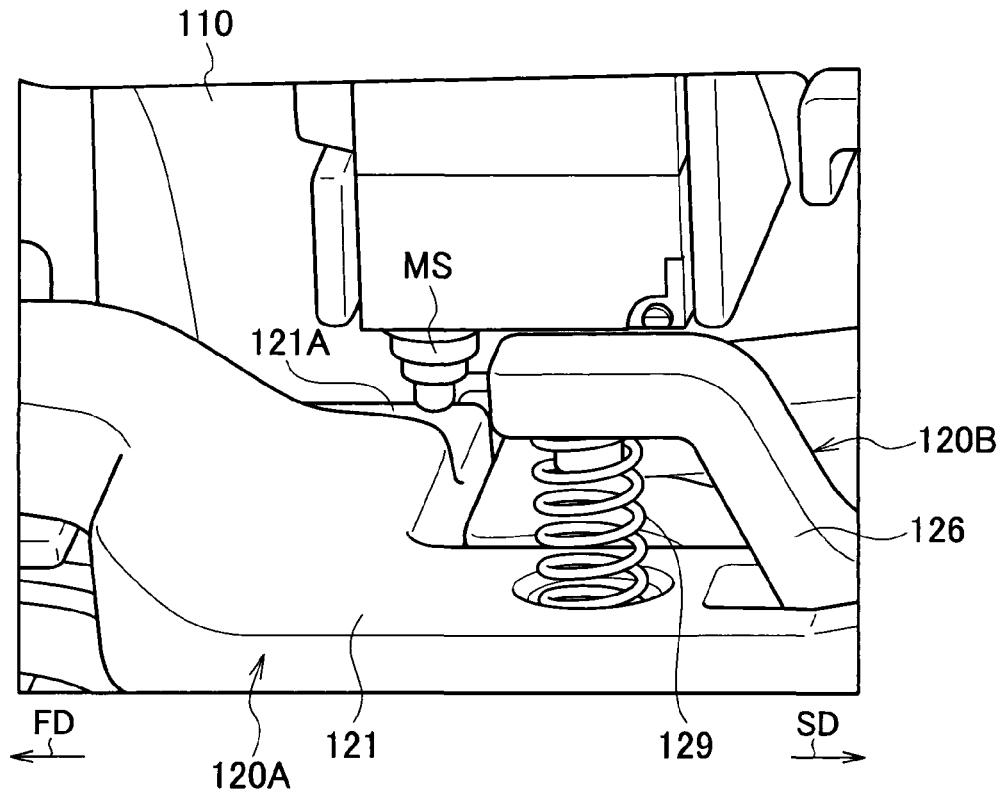
FIGS. 7A and 7B are enlarged perspective views illustrating a portion of a first lock unit and a portion of the second lock unit according to the present embodiment.
Figure 7B:
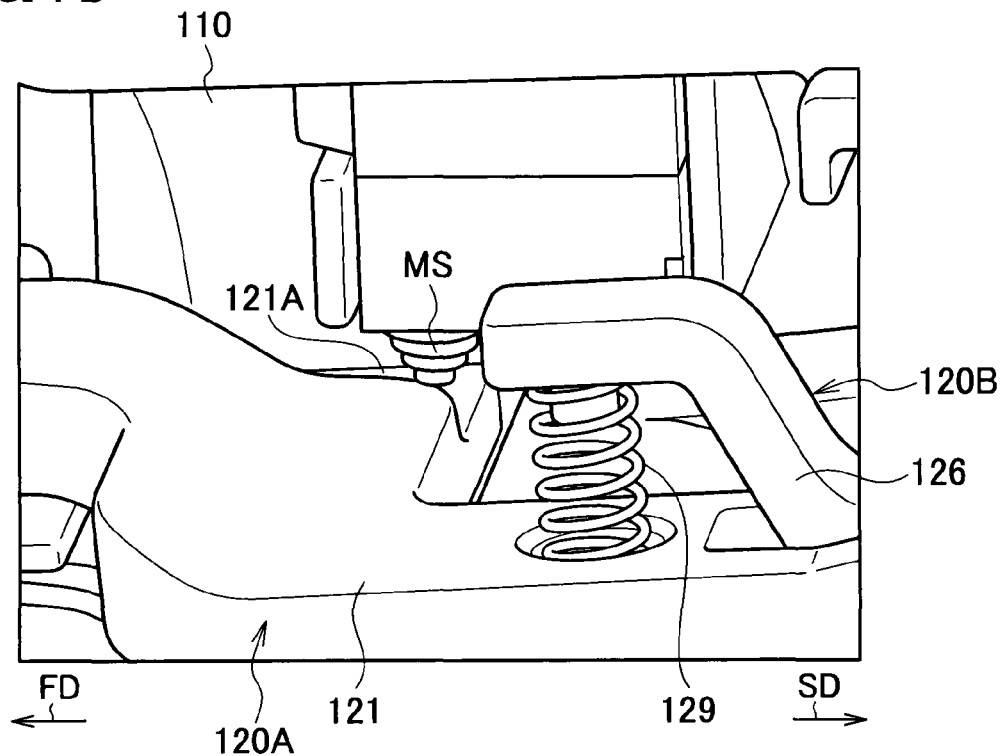

The lock arm 121 is provided with a pressing portion 121A (see FIG. 14) that presses a micro switch MS that can detect the protrusion/retraction of the lock claw 122 from a cutout 116 (see FIGS. 2, 4 and 5) formed at the connector fitting portion 111. As illustrated in FIG. 7A, when the lock claw 122 protrudes from the cutout 116 of the connector fitting portion 111, the pressing portion 121A does not press the micro switch MS. As illustrated in FIG. 7B, when the lock claw 122 retracts into the connector fitting portion 111, the pressing portion 121A presses the micro switch MS.

A support groove 121B (see FIGS. 8 to 10) supporting the second lock unit 120B is formed at the lock arm 121, and the second lock unit 120B abuts an edge portion of the support groove 121B and thus swings together with the lock arm 121.

The lock claw 122 is protrudable from/retractable to (advanceable from/retreatable to) the cutout 116 of the connector fitting portion 111 to the outside. A power receiving connector 10 side of the lock claw 122 is provided with a cam surface 122A inclining in the fitting/separating direction FSD, and a separating direction SD side of the lock claw 122 is provided with a lock surface 122B perpendicular to the fitting/separating direction FSD (see FIG. 6B).

The lock piece 123 extends in the top direction TD, and is latchable to the latch groove portion 143 (first latch groove portion 143A) of the lock release unit 140. The lock piece 123 is provided at a position facing a latch piece 133 of the fitting detecting mechanism 130, which will be described later. An air gap 123A (see FIGS. 8 to 10) opening in the width direction WD perpendicular to the fitting/separating direction FSD is provided between the lock piece 123 and the lock arm 121.

While the lock claw 122 is in a state of retracting into the connector fitting portion 111, the lock arm 121 swings, so that the lock piece 123 latches to the latch groove portion 143 (first latch groove portion 143A) of the lock release unit 140. While the lock claw 122 is in a state of protruding from the connector fitting portion 111, the lock arm 121 swings, so that the latching of the lock piece 123 to the latch groove portion 143 of the lock release unit 140 is released.

As illustrated in FIGS. 5 and 6, the second lock unit 120B includes an auxiliary arm 126 that is connected to the lock arm 121, and an auxiliary latch piece 127 that is provided at an end of the auxiliary arm 126 on the near side in the fitting direction FD and is latchable to the latch groove portion 143 (second latch groove portion 143B) of the lock release unit 140.

The auxiliary arm 126 is pivotably supported to be swingable by the lock arm shaft 124, and the auxiliary latch piece 127 is biased by a coil spring 129 in the bottom direction BD. The auxiliary arm 126 is provided in the support groove 121B formed at the lock arm 121, and swings together with the lock arm 121.

The auxiliary latch piece 127 extends in the bottom direction BD, and is latchable to the latch groove portion 143 (second latch groove portion 143B) of the lock release unit 140. The auxiliary latch piece 127 is provided at a position facing the lock piece 123. While the lock claw 122 is in a state of retracting into the connector fitting portion 111, the lock arm 121 swings, so that the latching of the auxiliary latch piece 127 to the latch groove portion 143 (second latch groove portion 143B) of the lock release unit 140 is released.

A power receiving connector 10 side of the auxiliary latch piece 127 is provided with a lock surface 127B perpendicular to the fitting/separating direction FSD, and a separating direction SD side of the auxiliary latch piece 127 is provided with a cam surface 127A inclining in the fitting/separating direction FSD (see FIGS. 6A and 8).

(Fitting Detecting Mechanism)

The fitting detecting mechanism 130 detects a fitting state between the power receiving connector 10 and the connector fitting portion 111. As illustrated in FIGS. 5 and 8 to 10, the fitting detecting mechanism 130 includes a latch arm 131 that is swingably provided in the connector case 110, a latch claw 132 (FIGS. 2, 4 and 5) that is provided at one end of the latch arm 131 on a power receiving connector 10 side and is protrudable/retractable from the connector fitting portion 111, and a latch piece 133 that is provided at the other end of the latch arm 131 and is latchable to the latch groove portion 143 (second latch groove portion 143B) of the lock release unit 140.

The latch arm 131 is pivotably supported by a latch arm shaft 134, and the latch claw 132 is biased by a coil spring 135 as a latch arm bias member toward the top direction TD that is the protruding direction from the outer periphery of the connector fitting portion 111.

The latch arm 131 includes a protrusion 131A (see FIG. 6) as a latch state release portion that releases the latching between the latch groove portion 143 and the lock-release hold portion 160 (a hold latch piece 162 to be described later) when the later-described latch groove portion 143 (second latch groove portion 143B) of the lock release unit 140 and the latch piece 133 latch together. The protrusion 131A protrudes in the bottom direction BD to abut the lock-release hold portion 160 (a hold arm 161 to be described later).

The latch claw 132 is protrudable/retractable (advanceable/retreatable) to the outside from the cutout 116 formed at the connector fitting portion 111. A power receiving connector 10 side of the latch claw 132 is provided with a cam surface 132A inclining in the fitting/separating direction FSD, and a separating direction SD side of the latch claw 132 is provided with a perpendicular surface 132B perpendicular to the fitting/separating direction FSD (see FIG. 6C). The latch claw 132 is provided on the nearer side than the lock claw 122 in the fitting direction FD (that is, on the separating direction SD side of the lock claw 122), and is provided with the lock claw 122 along the fitting/separating direction FSD (or along the fitting direction FD).

A width W2 of the latch claw 132 in the width direction WD is smaller than a width W1 of the lock claw 122 in the width direction WD (see FIGS. 6B and 6C). That is, the latch claw 132 is provided within a projection surface of the lock claw 122 when viewed from a front side of the electrical connector 100.

The latch piece 133 is provided on the nearer side than the lock claw 122 in the fitting direction of the connector fitting portion 111 to the power receiving connector 10. While the latch claw 132 is in a state of retracting into the connector fitting portion 111, the latch arm 131 swings, so that the latching of the latch piece 133 to the latch groove portion 143 (second latch groove portion 143B) of the lock release unit 140 is released.

(Lock Release Unit)

The lock release unit 140 is slidable in the fitting/separating direction FSD, and is biased by a coil spring 144 to a rear side of the fitting direction FD (that is, a separating direction SD side). As illustrated in FIG. 5, the lock release unit 140 includes a release switch 141 as an operation portion advanceable from/retreatable to the connector case 110, and a release body portion 142 integrated with the release switch 141. The lock release unit 140 releases the latch state between the power receiving connector 10 and the connector fitting portion 111 by the pressing operation of the release switch 141.

The release body portion 142 is provided with the latch groove portion 143 as a latch portion that is latched to a portion (lock piece 123 and auxiliary latch piece 127) of the lock mechanism 120 in the connector case 110 and to a portion (latch piece 133) of the fitting detecting mechanism 130. The latch groove portion 143 includes the first latch groove portion 143A latching to the lock piece 123, and the second latch groove portion 143B latching to the auxiliary latch piece 127. The first latch groove portion 143A is provided at a bottom side of the release body portion 142, and the second latch groove portion 143B is provided at a top side of the release body portion 142 to face the first latch groove portion 143A.

A spring support portion 142A biased by the coil spring 144 as a release bias member is provided on the upper side of the release body portion 142. By the biasing of the coil spring 144 to the release body portion 142, the release switch 141 is movable in the direction of protruding from the connector case 110 (that is, the separating direction SD). That is, while the power receiving connector 10 and the connector fitting portion 111 are in a state of fitting together, when all the latching to the latch groove portion 143 is released, the release switch 141 moves in the separating direction SD and becomes operable, so that the lock release unit 140 can be used to release the fitting state between the power receiving connector 10 and the connector fitting portion 111.

A regulation wall surface 145 (FIGS. 11 to 13) is provided under the release body portion 142, and is movable in the fitting/separating direction FSD between a micro switch 151 and a movable shaft 153 of the power feedability determining mechanism 150.

Figure 12:
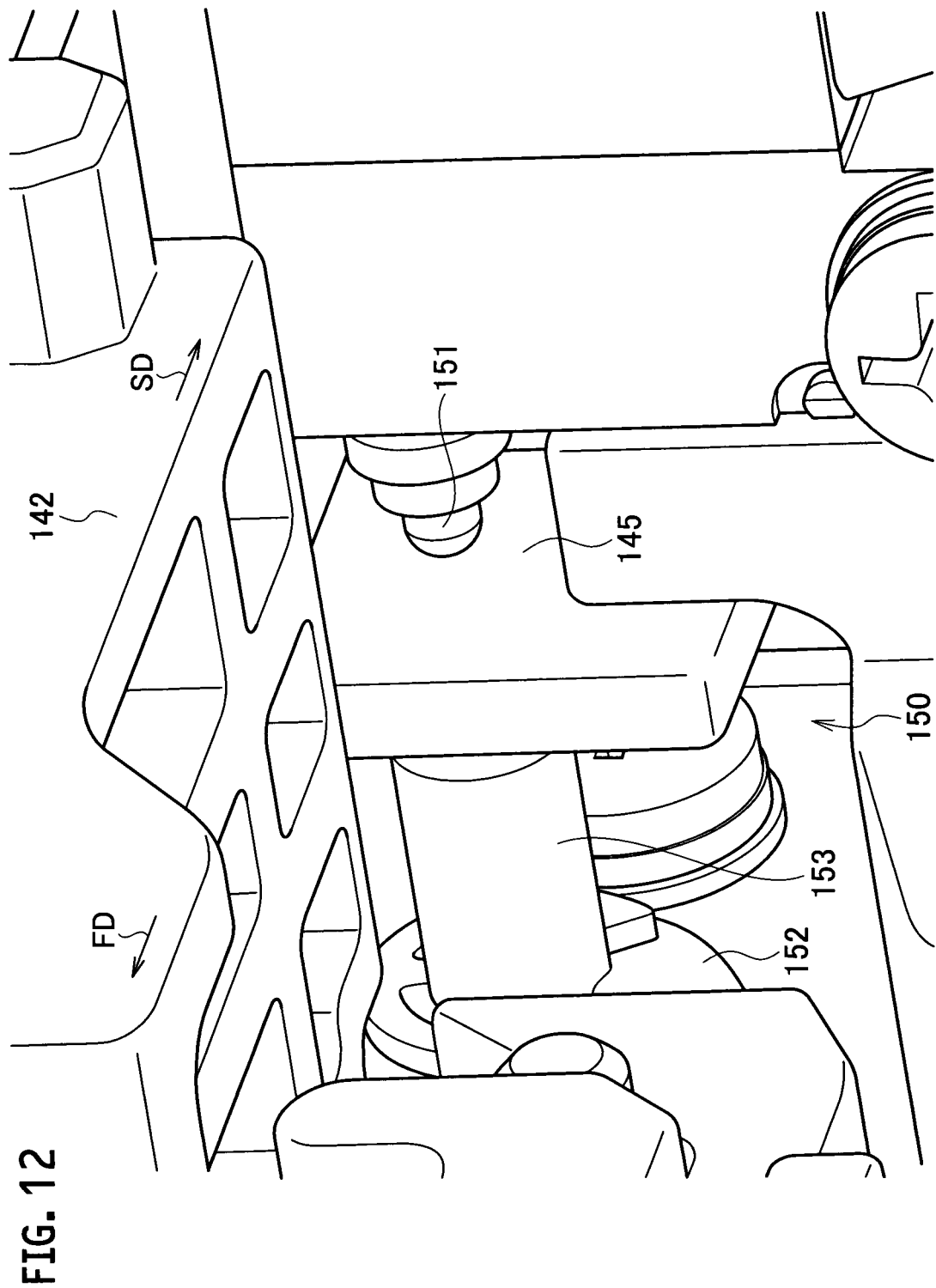
FIG. 12 is an enlarged perspective view illustrating the neighborhood of the power feedability determining mechanism according to the present embodiment (No. 1).
Figure 13:
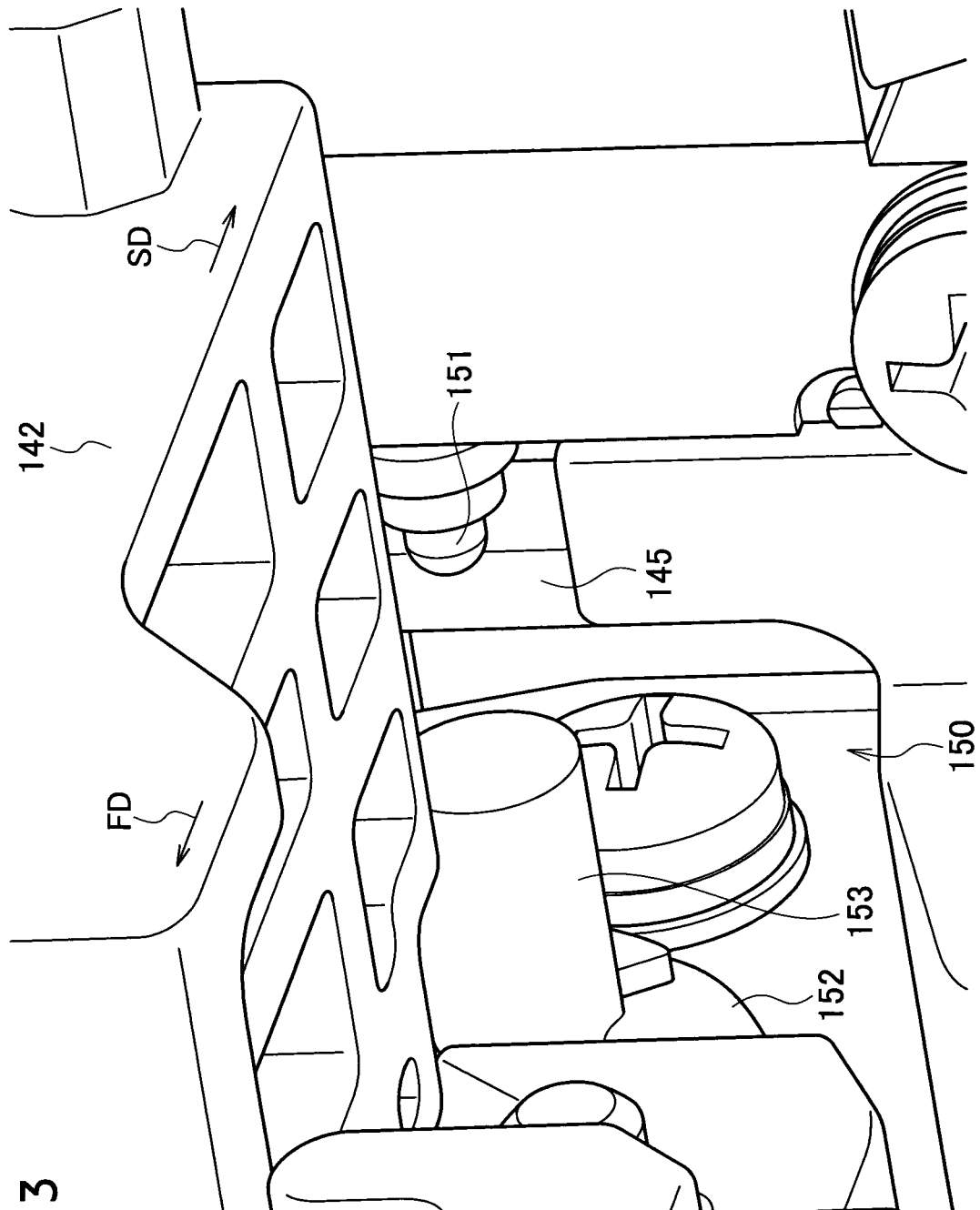
FIG. 13 is an enlarged perspective view illustrating the neighborhood of the power feedability determining mechanism according to the present embodiment (No. 2).

The regulation wall surface 145 moves in the fitting/separating direction FSD together with the release switch 141 and the release body portion 142. Specifically, when all the latch pieces (lock piece 123, auxiliary latch piece 127, and latch piece 133) latch to the latch groove portion 143, the release switch 141 is in a state of being pressed and the regulation wall surface 145 is located between the micro switch 151 and the movable shaft 153 as illustrated in FIG. 12. On the other hand, when all the latching to the latch groove portion 143 is released, the release switch 141 protrudes from the connector case 110, so that the regulation wall surface 145 retracts from a portion between the micro switch 151 and the movable shaft 153 as illustrated in FIG. 13.

(Power Feedability Determining Mechanism)

The power feedability determining mechanism 150 determines the power feedability between the power receiving connector 10 and the connector fitting portion 111 by enabling power feeding when the power receiving connector 10 and the connector fitting portion 111 are in a state of fitting together (in a complete fitting state), and by disabling power feeding when the power receiving connector 10 and the connector fitting portion 111 are in a state of half-fitting together (in an incomplete fitting state).

As illustrated in FIGS. 8 to 10, 11, and 12, the power feedability determining mechanism 150 includes the micro switch 151 and a solenoid 152 that is provided at a position spaced apart from the micro switch 151 in the width direction WD.

The micro switch 151 does not flow a current from the electrical connector 100 to the power receiving connector 10 when the micro switch 151 is not in a state of being abutted by a portion (movable shaft 153 to be described below) of the solenoid 152.

The solenoid 152 includes a movable shaft 153 that moves in the width direction WD when the power receiving connector 10 and the connector fitting portion 111 change from a half-fitting state to a fitting state, and a regulation arm 154 (see FIGS. 9 and 10) that moves according to the movement of the movable shaft 153.

The movable shaft 153 moves according to information (instruction) from a power supply unit (not illustrated) connected to an end portion of the electric wire W extending from the handle portion 115 to the outside. When the above-described regulation wall surface 145 of the lock release unit 140 is located between the micro switch 151 and the movable shaft 153, the movable shaft 153 does not abut the micro switch 151 (see FIG. 12).

The regulation arm 154 is insertable/extractable into/from the air gap 123A formed at the lock arm 121. The regulation arm 154 is inserted into the air gap 123A to regulate the swing of the lock arm 121. As illustrated in FIGS. 8 to 10, the regulation arm 154 includes a connection portion 154A connected to the movable shaft 153, an arm portion 154B provided in the fitting/separating direction FSD, and a front end portion 154C formed along an axis of the movable shaft 153 (i.e. along the width direction WD), the front end portion 154C being insertable into the air gap 123A. For example, as illustrated in FIG. 9, the front end portion 154C is located outside the air gap 123A when the movable shaft 153 is in a state of being spaced apart from the micro switch 151. On the other hand, as illustrated in FIG. 10, when the front end portion 154C moves in the width direction WD together with the movable shaft 153 and the movable shaft 153 is in a state of abutting the micro switch 151, the front end portion 154C is located inside the air gap 123A.

(Lock-Release Hold Portion)

Figure 14:
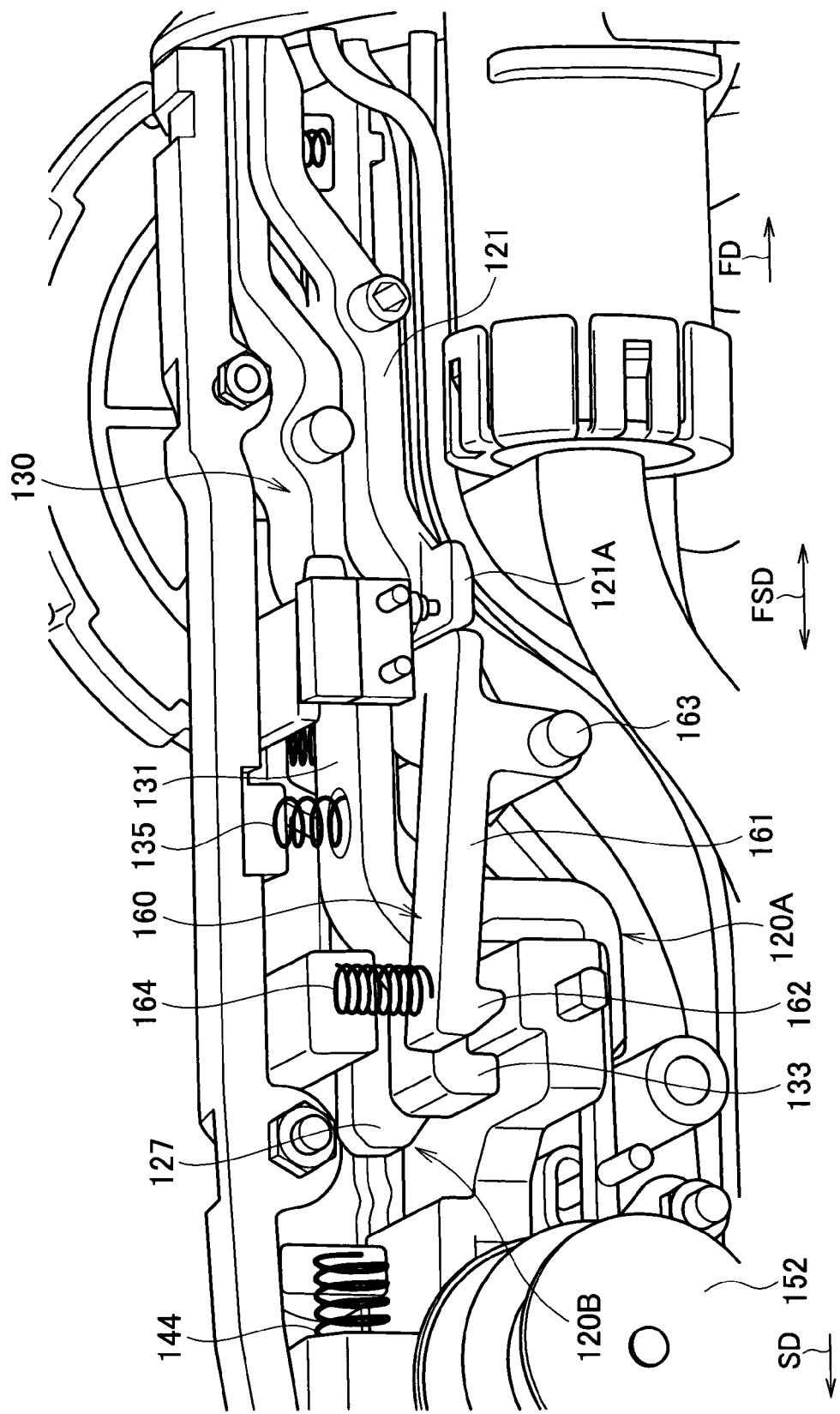
FIG. 14 is an enlarged perspective view illustrating the neighborhood of a lock-release hold portion according to the present embodiment.
Figure 15:
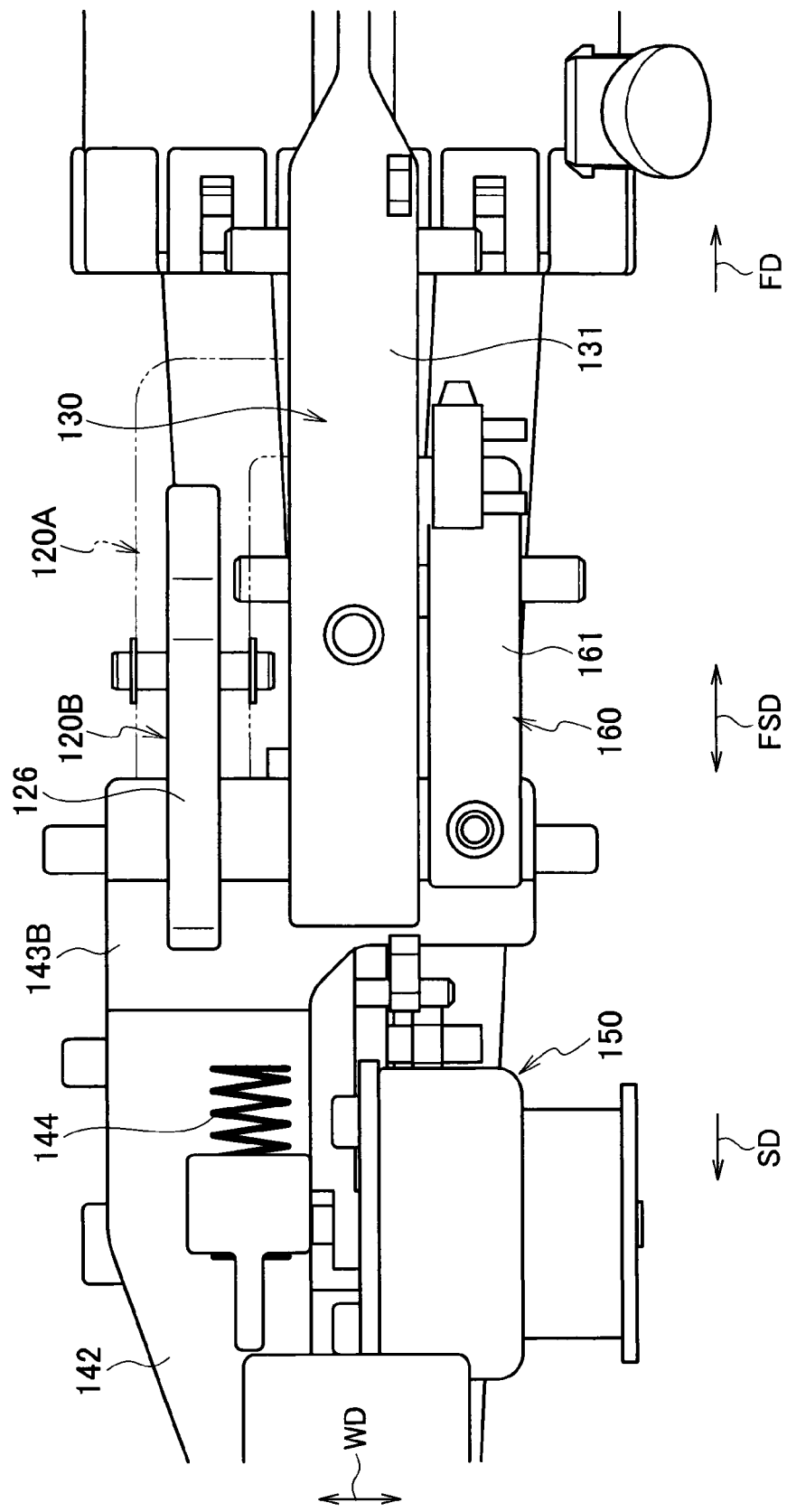
FIG. 15 is a plan view (top view) illustrating the inside of the electrical connector according to the present embodiment.

The lock-release hold portion (push position hold portion) 160 holds the release switch 141 of the lock release unit 140 when the release switch 141 is in a state of being pressed. As illustrated in FIGS. 14 and 15, the lock-release hold portion 160 includes a hold arm 161 that is swingably provided in the connector case 110, and a hold latch piece 162 that is provided at a near side end portion of the hold arm 161 in the fitting direction FD and is latched to the second latch groove portion 143B of the lock release unit 140 at a position where the release switch 141 is pressed.

The hold arm 161 is pivotably supported by a hold arm shaft 163, and a rear side in the fitting direction FD (that is, the separating direction SD side) is biased by a coil spring 164 as a hold arm bias member toward the bottom direction BD.

(2) Operation of Electrical Connector

Next, an operation of the electrical connector 100 according to the present embodiment will be described with reference to the drawings. FIGS. 16 to 26 are views for describing an operation of the electrical connector 100 according to the present embodiment.

The electrical connector 100 charges a battery (not illustrated) mounted on a vehicle such as an electric vehicle (EV) or a hybrid electric vehicle (HEV) according to information (instruction) from a power supply unit (not illustrated) connected to an end portion of the electric wire W extending from the handle portion 115 to the outside, when being in a state of fitting to the power receiving connector 10.

(From Separating State to Fitting State)

Figure 16:
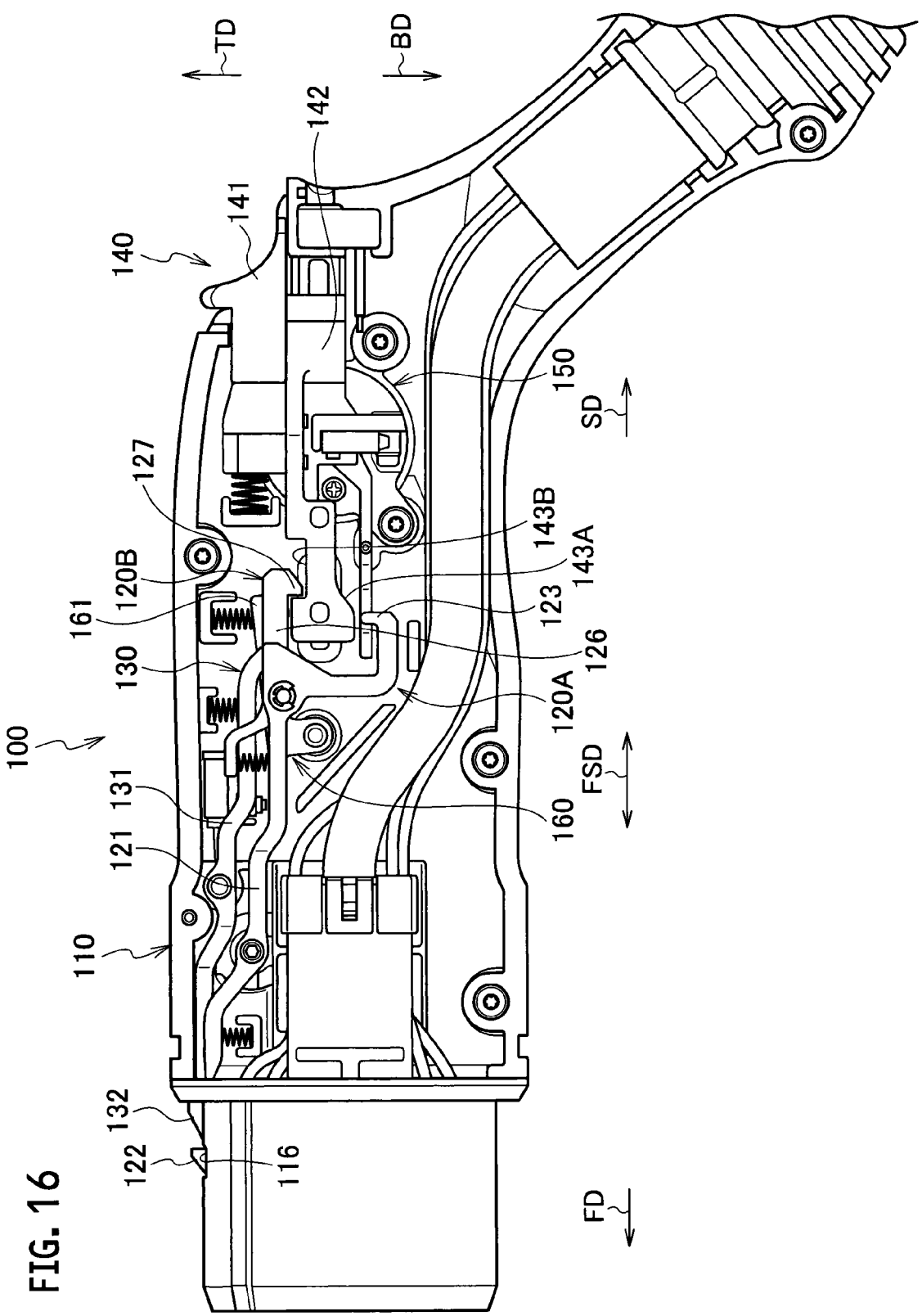
FIG. 16 is a cross-sectional view illustrating an operation (separated state) of the electrical connector according to the present embodiment.

As illustrated in FIG. 16, when the power receiving connector 10 and the electrical connector 100 are in a state of separating from each other, the lock claw 122 and the latch claw 132 protrude from the cutout 116 of the connector fitting portion 111. At this time, the latch piece 133 is latched to the second latch groove portion 143B of the lock release unit 140. Since the auxiliary latch piece 127 of the second lock unit 120B is provided on the separating direction SD side from the latch piece 133, the auxiliary latch piece 127 is in a state of being immediately latchable to the second latch groove portion 143B when the latching between the latch piece 133 and the second latch groove portion 143B is released while the auxiliary latch piece 127 is not in a state of being completely latched to the second latch groove portion 143B. In this separating state, the release switch 141 is in a state of being unoperatable.

Figure 17:
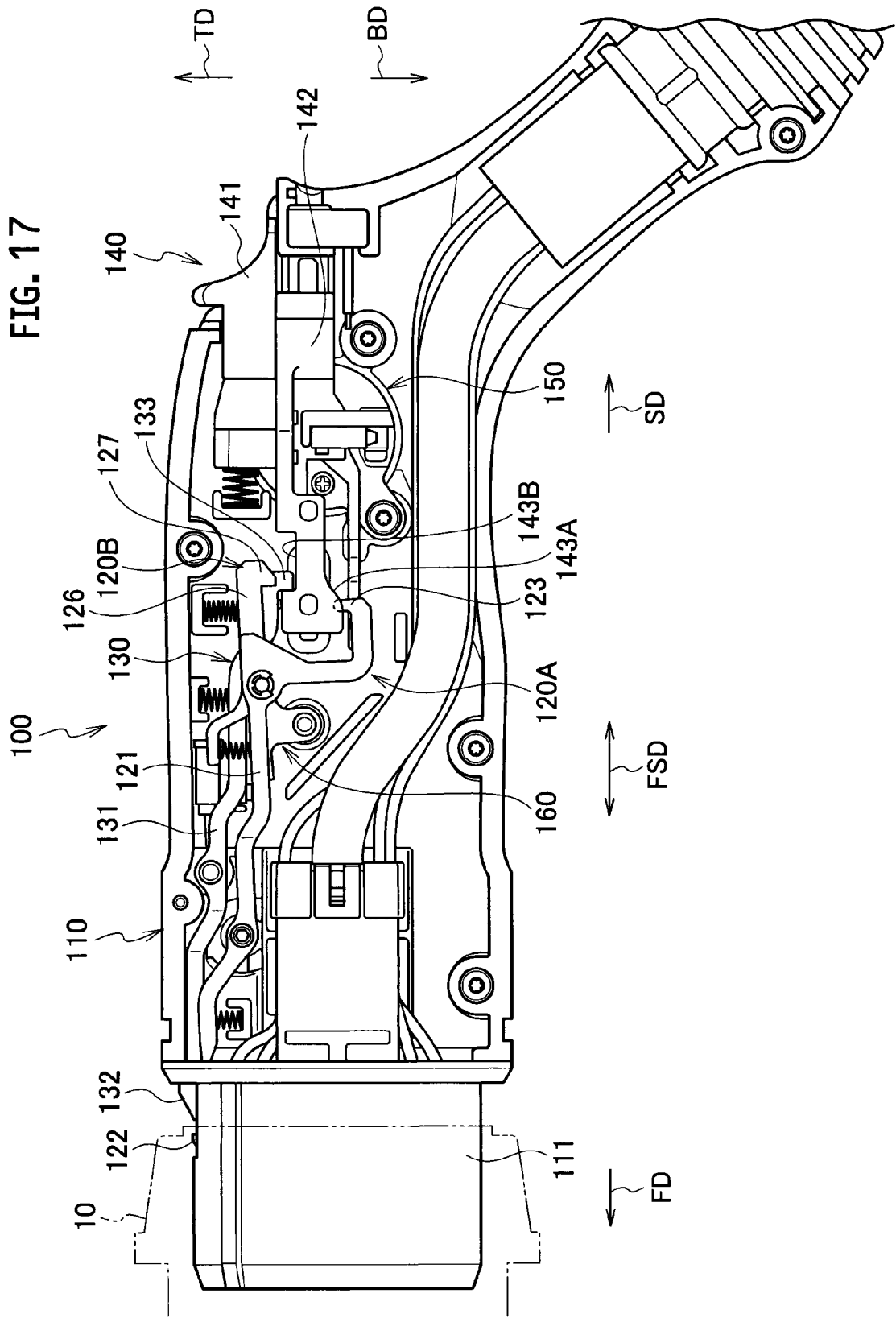
FIG. 17 is a cross-sectional view illustrating an operation (fitting state) of the electrical connector according to the present embodiment (No. 1).

Subsequently, as illustrated in FIG. 17, when the power receiving connector 10 and the electrical connector 100 are gradually fitted together, the hood portion 12 of the power receiving connector 10 retreats (presses) the lock claw 122 into the connector fitting portion 111. Then, the lock arm 121 swings, and thus the auxiliary latch piece 127 deviates from the second latch groove portion 143B. At this time, the latch piece 123 is inserted into the first latch groove portion 143A of the lock release unit 140.

Figure 18:
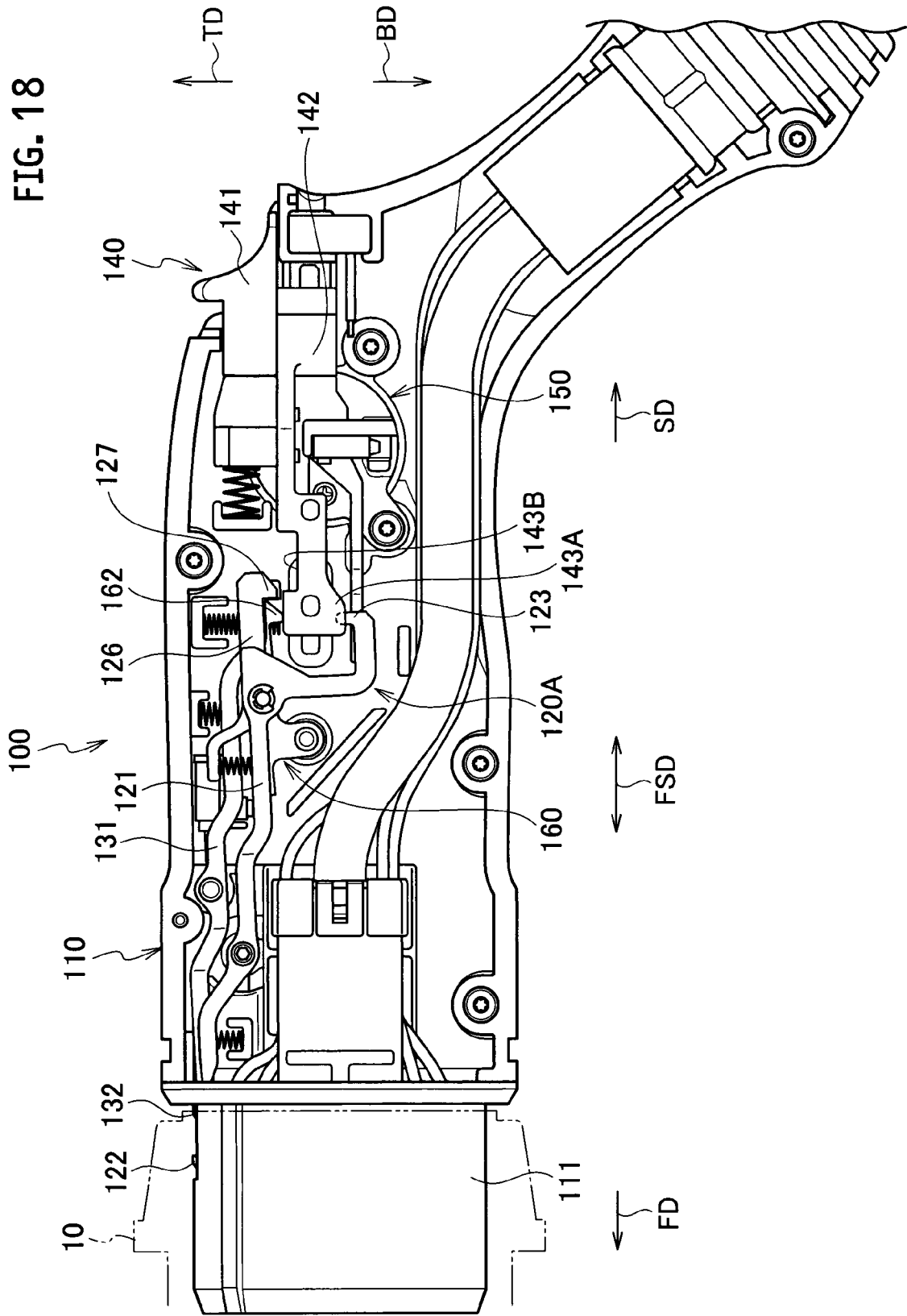
FIG. 18 is a cross-sectional view illustrating an operation (fitting state) of the electrical connector according to the present embodiment (No. 2).
Figure 19:
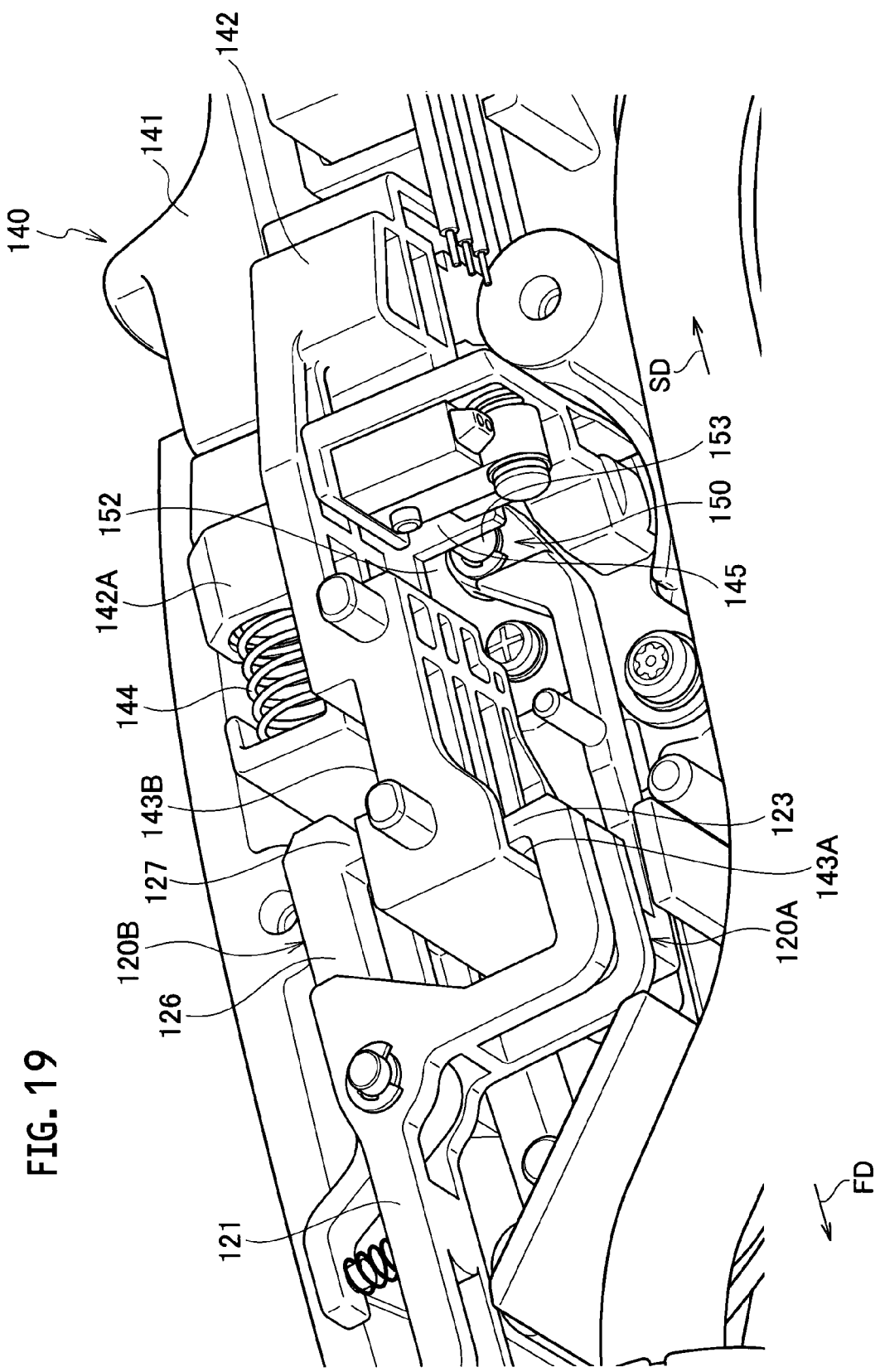
FIG. 19 is an enlarged perspective view illustrating the neighborhood of a lock mechanism and the lock release unit according to the present embodiment (No. 1).

Subsequently, as illustrated in FIG. 18, when the power receiving connector 10 and the electrical connector 100 are further fitted together, the hood portion 12 of the power receiving connector 10 presses the latch claw 132 into the connector fitting portion 111. Then, the latch arm 131 swings, and thus the latch piece 133 removes from the second latch groove portion 143B. Then, as illustrated in FIG. 19, the lock piece 123 is latched to the first latch groove portion 143A of the lock release unit 140, and the release switch 141 is yet in a state of being unoperatable.

Figure 20:
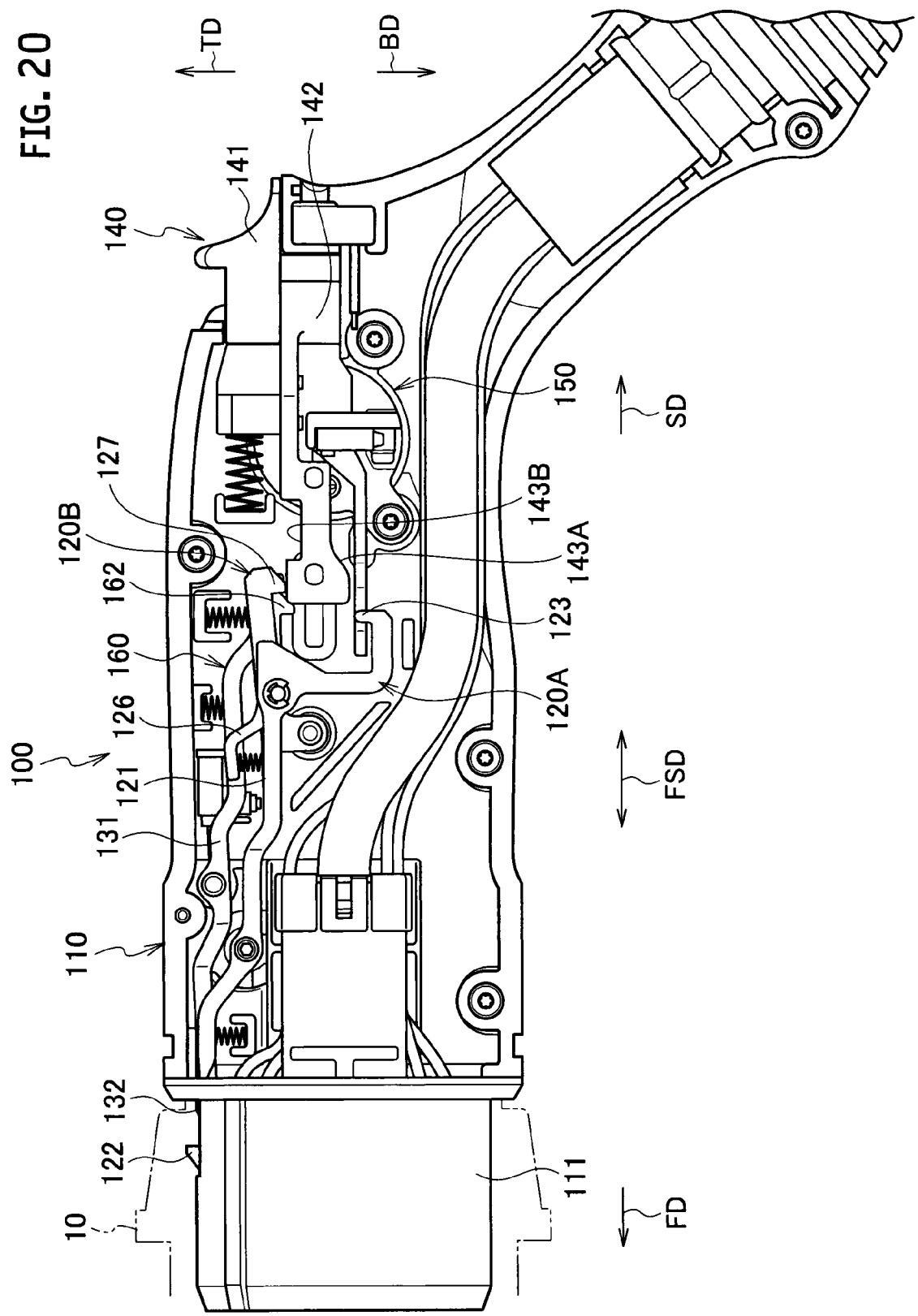
FIG. 20 is a cross-sectional view illustrating an operation (fitted state) of the electrical connector according to the present embodiment.

Subsequently, as illustrated in FIG. 20, when the power receiving connector 10 and the electrical connector 100 are completely fitted together, the lock claw 122 protrudes from the cutout 116 of the connector fitting portion 111 in the hood portion 12 of the power receiving connector 10 to be latched to the power receiving connector 10, and the lock piece 123 removes from the first latch groove portion 143A of the lock release unit 140.

Figure 21:
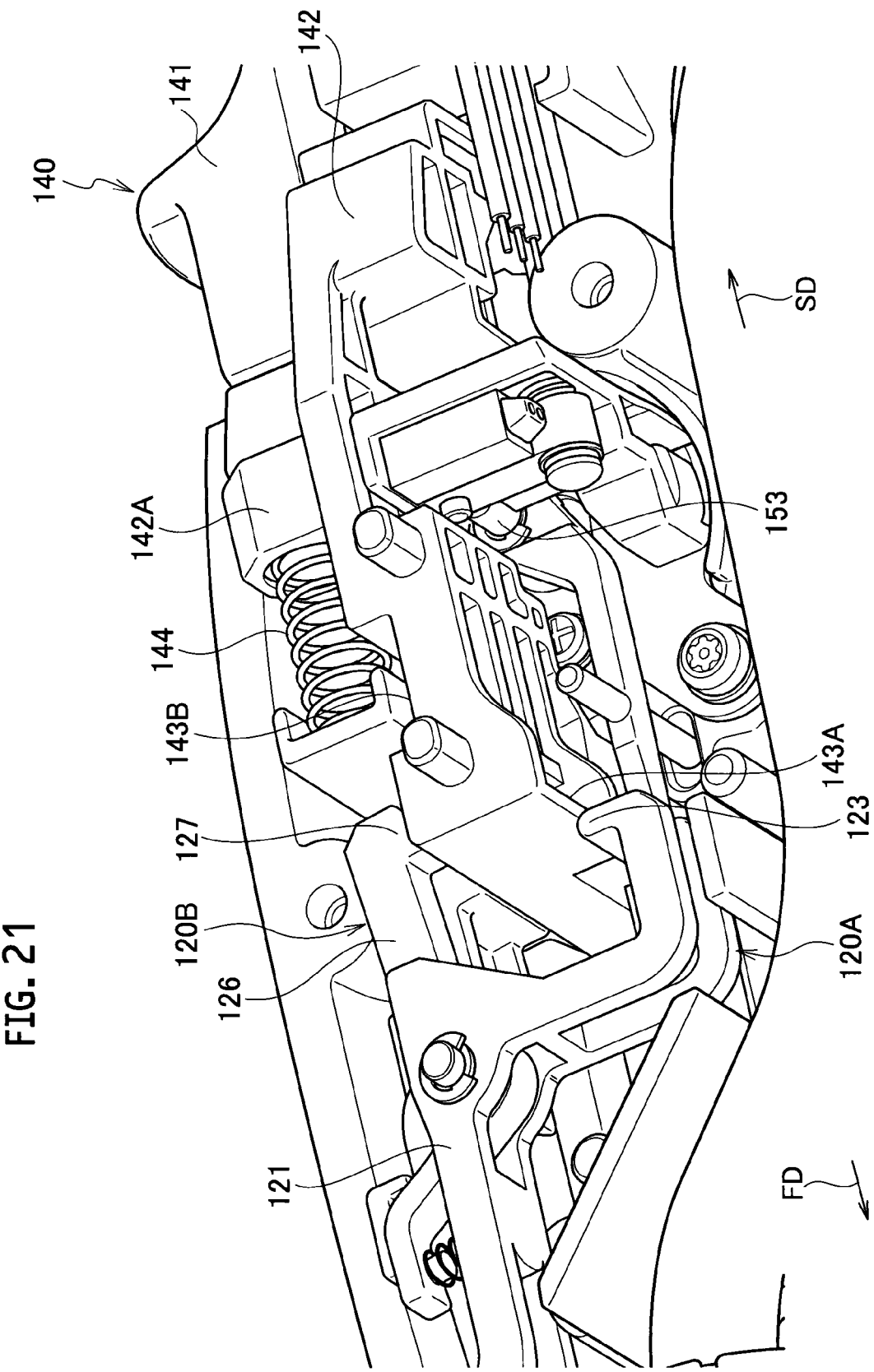
FIG. 21 is an enlarged perspective view illustrating the neighborhood of the lock mechanism and the lock release unit according to the present embodiment (No. 2).
Figure 22:
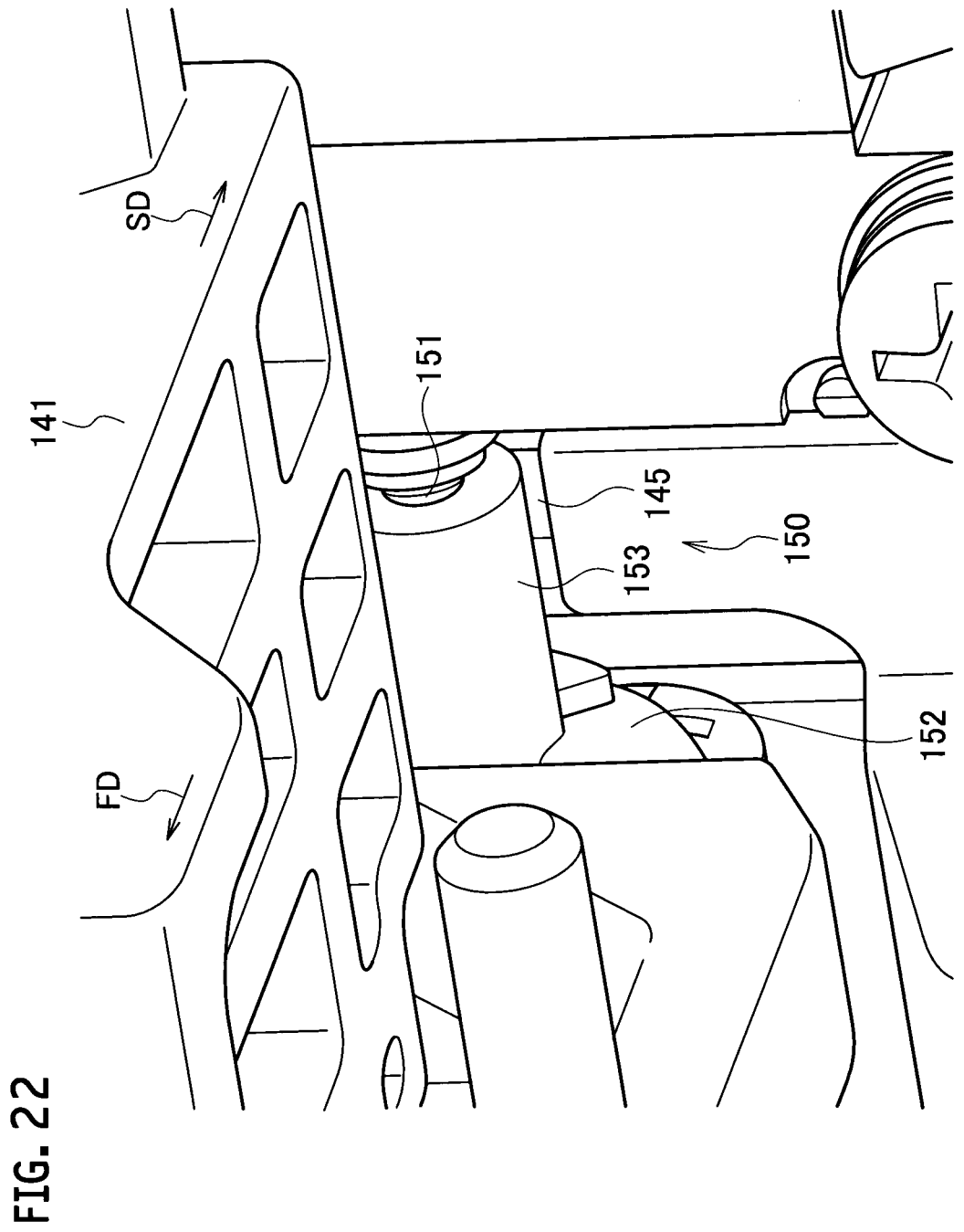
FIG. 22 is an enlarged perspective view illustrating an operation of a movable shaft of the power feedability determining mechanism according to the present embodiment (No. 1).

As illustrated in FIGS. 20 and 21, the release switch 141 moves toward the separating direction SD because all the latching to the latch groove portion 143 is released. Accordingly, the regulation wall surface 145 of the lock release unit 140 located between the micro switch 151 and the movable shaft 153 moves to the separating direction SD side. Then, as illustrated in FIG. 22, the movable shaft 153 of the power feedability determining mechanism 150 protrudes along the width direction WD and presses the micro switch 151, thereby becoming a chargeable state.

(Charge Mode)

Figure 23:
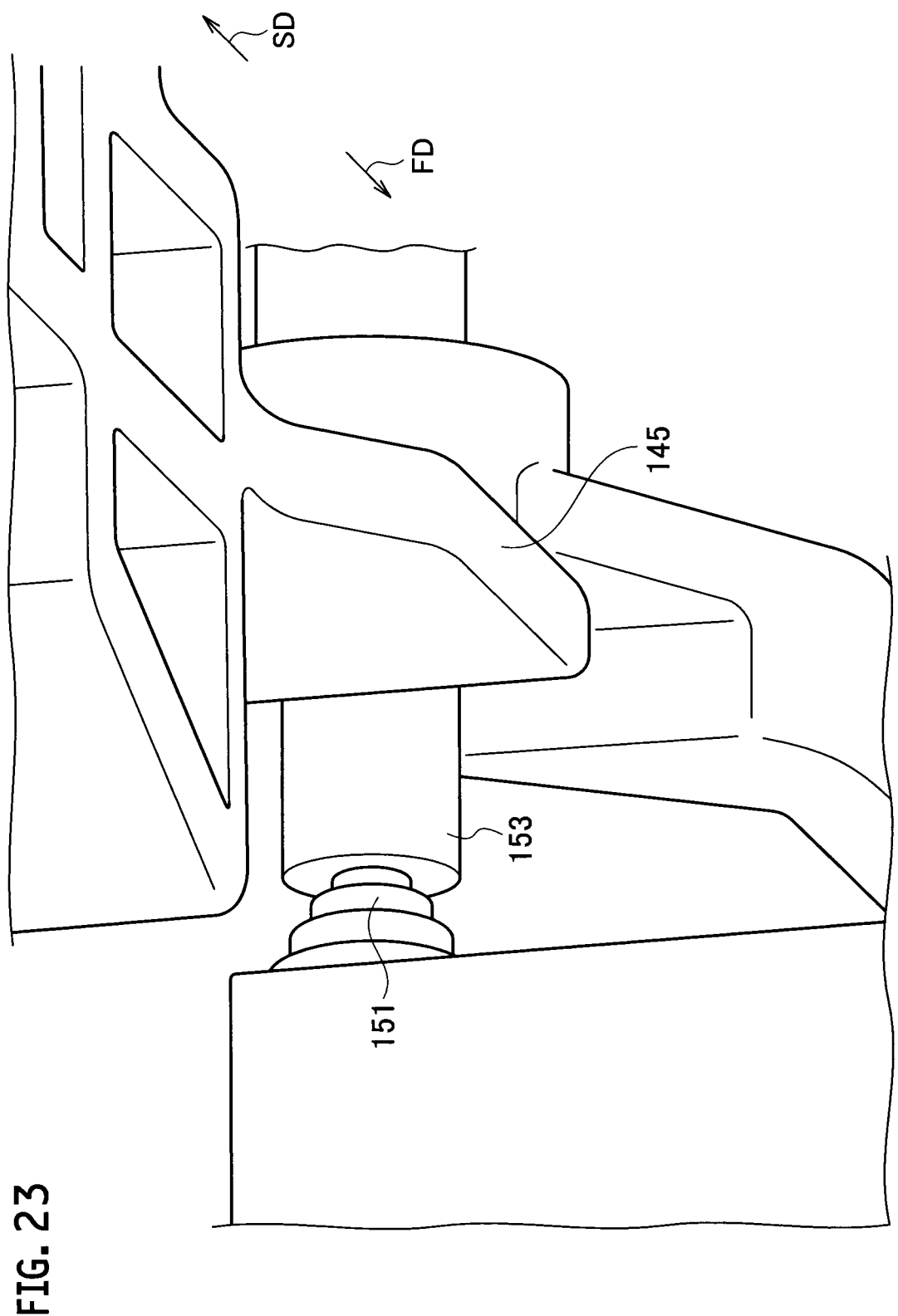
FIG. 23 is an enlarged perspective view illustrating an operation of the movable shaft of the power feedability determining mechanism according to the present embodiment (No. 2).

As illustrated in FIG. 23, in a charge mode, even when the release switch 141 is about to be moved in the fitting direction FD, the regulation wall surface 145 bumps against the movable shaft 153 abutting the micro switch 151. This may make it impossible to operate the release switch 141.

In addition, the regulation arm 154 is inserted into the air gap 123A of the lock arm 121 (see FIG. 10). Therefore, even when the release switch 141 is about to be moved in the fitting direction FD, the swing of the lock arm 121 can be prevented, so that the removal of the lock claw 122 from the connector housing 11 can be prevented.

Accordingly, the fitting of the power receiving connector 10 and the connector fitting portion 111 can be prevented from being accidentally released when charging the battery (not illustrated) mounted on the vehicle.

(From Fitting State to Separating State)

When the charging of the battery (not illustrated) mounted to the vehicle is completed, the movable shaft 153 of the solenoid 152 returns to the original state, so that the abutting between the micro switch 151 and the movable shaft 153 is released (see FIG. 13). Then, a gap occurs between the micro switch 151 and the movable shaft 153, and the regulation arm 154 retracts from the air gap 123A of the lock arm 121 (see FIG. 9). Accordingly, the lock release unit 140 is movable along the fitting direction FD.

Figure 24:
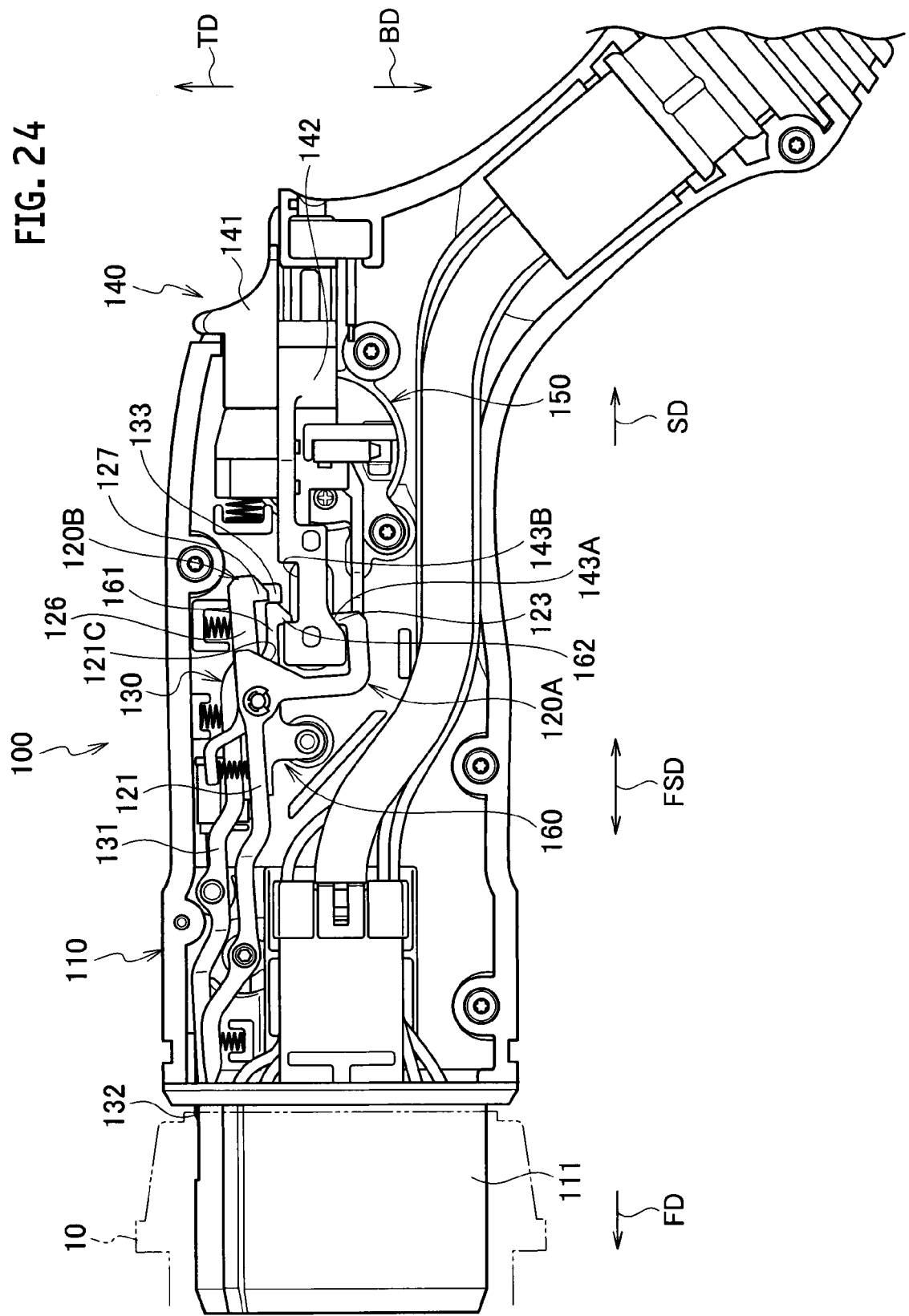
FIG. 24 is a cross-sectional view illustrating an operation (separating state) of the electrical connector according to the present embodiment (No. 1).

Subsequently, as illustrated in FIG. 24, when the release switch 141 is pressed against the fitting direction FD side, the release body portion 142 of the lock release unit 140 abuts an inclined surface 121C of the lock arm 121 and slides on the inclined surface 121C. Then, since the lock arm 121 swings, the lock piece 123 is latched to the first latch groove portion 143A of the lock release unit 140 and the hold latch piece 162 of the lock-release hold portion 160 is latched to the second latch groove portion 143B of the lock release unit 140. At this time, since the lock claw 122 is retracted into the connector fitting portion 111, the power receiving connector 10 and the electrical connector 100 can be separated from each other.

Figure 25:
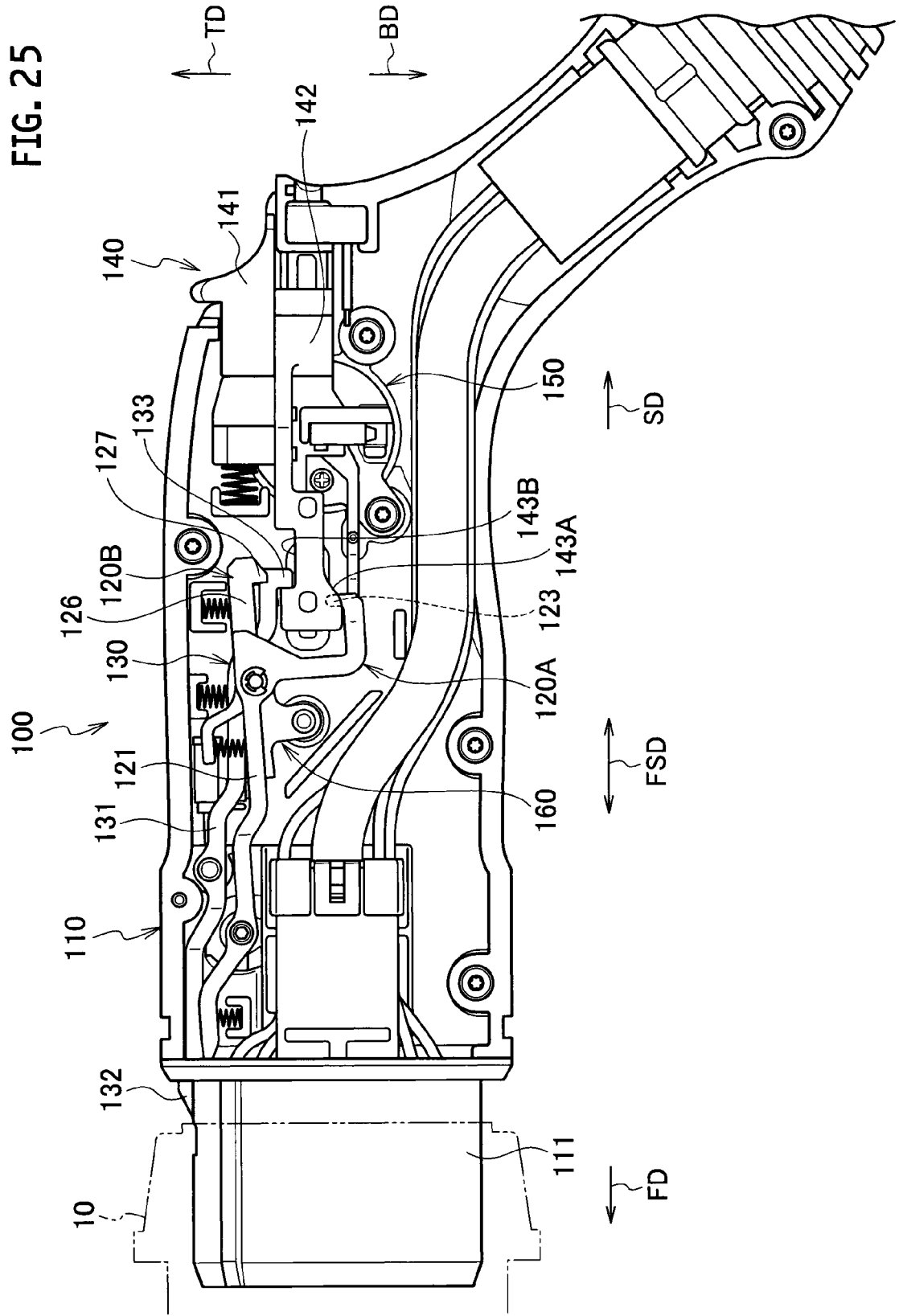
FIG. 25 is a cross-sectional view illustrating an operation (separating state) of the electrical connector according to the present embodiment (No. 2).
Figure 26:
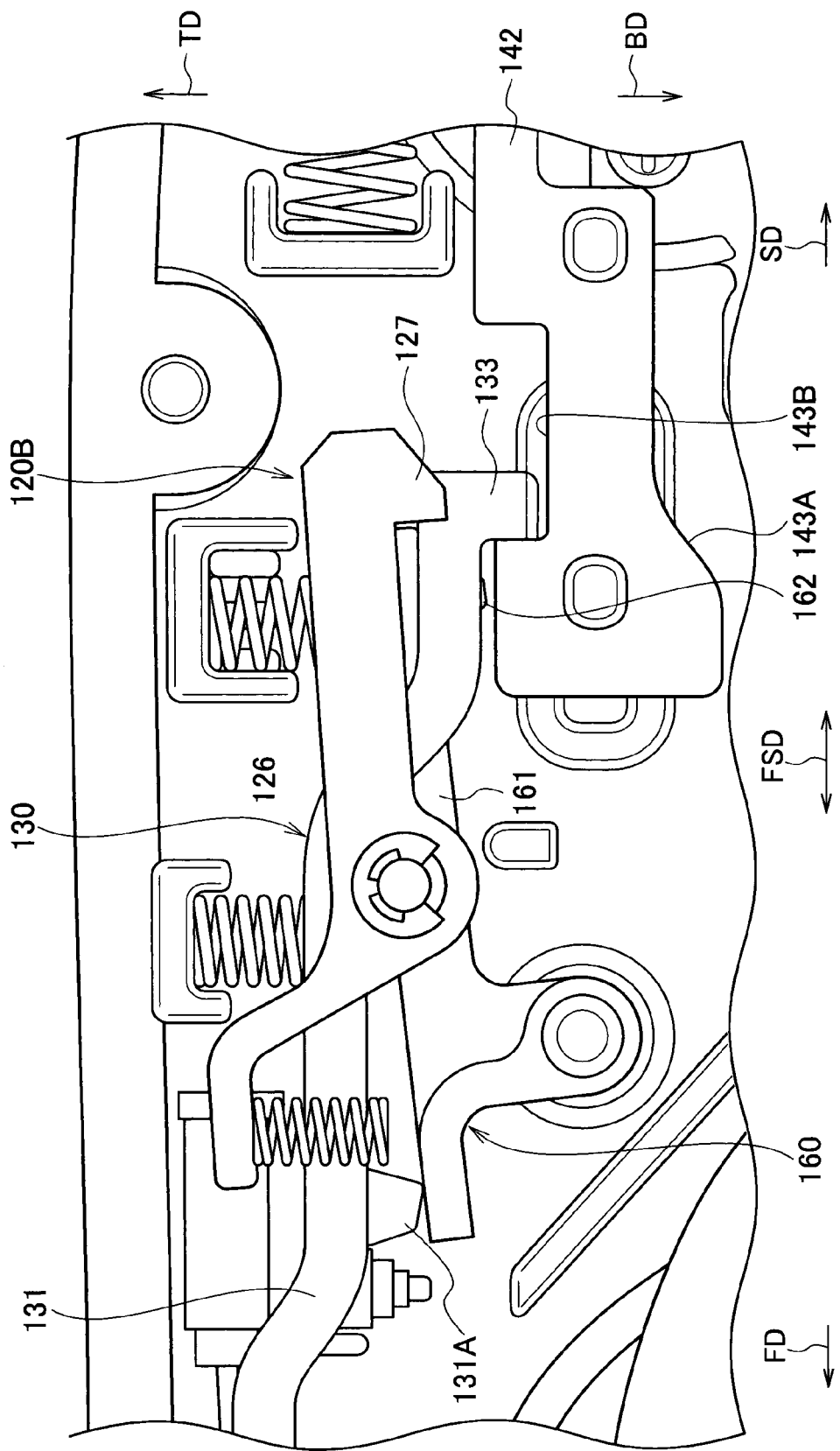
FIG. 26 is a cross-sectional view (partially enlarged cross-sectional view of FIG. 25) illustrating an operation of the electrical connector according to the present embodiment.

Subsequently, as illustrated in FIGS. 25 and 26, when the power receiving connector 10 and the electrical connector 100 are gradually separated from each other, the latch arm 131 swings and the latch claw 132 protrudes from the cutout 116 of the connector fitting portion 111, so that the latch piece 133 is latched to the second latch groove portion 143B of the lock release unit 140. At this time, the protrusion 131A of the latch arm 131 swings the hold arm 161 such that the fitting direction FD side is located in the bottom direction BD to be lower than the hold arm shaft 163 of the hold arm 161. Accordingly, the hold latch piece 162 of the lock-release hold portion 160 removes from the second latch groove portion 143B of the lock release unit 140.

Then, when the power receiving connector 10 and the electrical connector 100 are completely separated from each other, the lock claw 122 protrudes from the cutout 116 of the connector fitting portion 111 (see FIG. 16). Simultaneously, the lock piece 123 removes from the first latch groove portion 143A of the lock release unit 140, and the auxiliary latch piece 127 is in a state of being latchable to the second latch groove portion 143B of the lock release unit 140.

(3) Operation and Effect

In the above-described embodiment, the latch claw 132 is provided on the nearer side than the lock claw 122 in the fitting direction FD of the connector fitting portion 111 to the power receiving connector 10. While the latch claw 132 is in a state of retracting into the connector fitting portion 111, the latch arm 131 swings, so that the latching between the latch piece 133 and the second latch groove portion 143B is released. Accordingly, the latch claw 132 is retracted into the connector fitting portion 111 by the abutting on the hood portion 12 of the power receiving connector 10 to be later than the lock claw 122. Therefore, the latching between the latch piece 133 and the second latch groove portion 143B by the swing of the latch claw 132 is not released unless the latching between the auxiliary latch piece 127 and the second latch groove portion 143B by the swing of the auxiliary arm 126 is released.

That is, when only the latching between the auxiliary latch piece 127 and the second latch groove portion 143B by the swing of the auxiliary arm 126 is released, the power receiving connector 10 and the connector fitting portion 111 are not in a state of completely fitting together, and thus the release switch 141 does not protrude from the connector case 110 and is yet unoperatable. On the other hand, when the latching between the lock piece 123 or the auxiliary latch piece 127 and the latch groove portion 143 is released and also the latching between the latch piece 133 and the second latch groove portion 143B is released, the power receiving connector 10 and the connector fitting portion 111 are in a state of completely fitting together, and thus the release switch 141 protrudes from the connector case 110 and is operatable. Accordingly, the fitting state between the power receiving connector 10 and the connector fitting portion 111 can be detected according to the positional state of the release switch 141. Therefore, the battery can be prevented from being charged in the half-fitting state, thus making it possible to improve stability more securely.

The electrical connector 100 further includes the lock-release hold portion 160 that holds the position of the lock release unit 140 while the release switch 141 is in a state of being pressed. Accordingly, even when the release switch 141 is not continuously pressed in the fitting direction FD, the release switch 141 does not protrude from the connector case 110 and can be held in an unoperatable state. Accordingly, the operability is improved because an operator need not perform the operation while pressing the release switch 141.

In addition, the latch arm 131 includes the protrusion 131A that releases the latching between the hold latch piece 162 and the second latch groove portion 143B when the latch piece 133 and the second latch groove portion 143B are latched together. That is, while the release switch 141 does not protrude from the connector case 110, the latching between the hold latch piece 162 and the second latch groove portion 143B is released and the latch piece 133 and the second latch groove portion 143B are latched together. Therefore, the release switch 141 can be prevented from protruding from the connector case 110 accidentally when the connector fitting portion 111 is separated from the power receiving connector 10.

In the present embodiment, the auxiliary latch piece 127 is located at a position facing the lock piece 123. Accordingly, the lock piece 123 and the auxiliary latch piece 127 can be latched to the latch groove portion 143 of the lock release unit 140, thus making it possible to carry out a double locking. Therefore, even when the latching between the auxiliary latch piece 127 and the second latch groove portion 143B is released, the release switch 141 does not protrude from the connector case 110 and is unoperatable until the latching between the lock piece 123 and the first latch groove portion 143A is released. Accordingly, the abrupt protrusion of the release switch 141 from the connector case 110 can be securely prevented.

In the present embodiment, while the lock claw 122 is in a state of retracting into the connector fitting portion 111, the lock arm 121 swings and the lock piece 123 is latched to the first latch groove portion 143A. While the lock claw 122 is in a state of protruding from the connector fitting portion 111, the lock arm 121 swings and the latching of the lock piece 123 to the first latch groove portion 143A is released. That is, the latching between the lock piece 123 and the first latch groove portion 143A by the swing of the lock arm 121 is not released unless the lock claw 122 protrudes from the connector fitting portion 111 (that is, unless the lock claw 122 is locked to the power receiving connector 10). Therefore, until the lock claw 122 is locked to the power receiving connector 10, the release switch 141 does not protrude from the connector case 110 and can be made unoperatable, thus making it possible to improve safety more securely.

In the present embodiment, the latch claw 132 is provided with the lock claw 122 along the fitting direction FD. Accordingly, for example, when the connector housing 11 or the hood portion 12 of the power receiving connector 10 is damaged, even when the lock claw 122 does not abut the hood portion 12 of the power receiving connector 10 and only the latch claw 132 abuts the hood portion 12 and is retracted into the connector fitting portion 111, the latching between the lock piece 123 or the auxiliary latch piece 127 and the latch groove portion 143 is not released. Therefore, when the power receiving connector 10 and the connector fitting portion 111 are not in a state of completely fitting together (that is, when the lock claw 122 is not locked to the connector housing 11), the release switch 141 does not protrude from the connector case 110 and can be made unoperatable.

In the present embodiment, the width W2 of the latch claw 132 is smaller than the width W1 of the lock claw 122. Accordingly, it is possible to prevent the case where the lock claw 122 is not retracted into the connector fitting portion 111 and only the latch claw 132 is abruptly retracted into the connector fitting portion 111.

In the present embodiment, the regulation wall surface 145 is provided under the release body portion 142, and is movable in the fitting/separating direction FSD between the micro switch 151 and the movable shaft 153 of the power feedability determining mechanism 150. Accordingly, when the release switch 141 protrudes from the connector case 110 and is operatable, the regulation wall surface 145 retracts from the portion between the micro switch 151 and the movable shaft 153. Therefore, unless the power receiving connector 10 and the connector fitting portion 111 are not completely fitted together, the micro switch 151 is not turned on, and the battery can be prevented from being charged.

Also, in a charge mode, even when the release switch 141 is about to be moved in the fitting direction FD, the regulation wall surface 145 bumps against the movable shaft 153 abutting the micro switch 151. Therefore, in the charge mode, the release switch 141 can be prevented from moving in the fitting direction FD, so that the operation of the release switch 141 can be prevented. That is, in the charge mode, the lock claw 122 can be prevented from being removed and released from the power receiving connector 10, so that the power receiving connector 10 and the connector fitting portion 111 can be prevented from be separated from each other due to a fitting error thereof.

In the present embodiment, the regulation arm 154 is insertable/extractable into/from the air gap 123A of the lock arm 121 according to the movement of the movable shaft 153, and is inserted into the air gap 123A to regulate the swing of the lock arm 121. Accordingly, the lock arm 121 does not swing when the lock claw 122 is in a state of protruding from the connector fitting portion 111. Therefore, the fitting of the power receiving connector 10 and the connector fitting portion 111 can be prevented from be accidentally released during charging.

(4) Other Embodiments

Although the present invention has been described based on the above embodiments, it should not be understood that the statements and the drawings constituting a part of this disclosure limit the present invention. From this disclosure, various alternative embodiments, examples, and operation techniques will become apparent to those skilled in the art.

For example, the embodiments of the present invention may be changed as follows. Specifically, although the electrical connector 100 has been described as a connector charging a battery (not illustrated) mounted on a vehicle such as an electric vehicle (EV) or a hybrid electric vehicle (HEV), the present invention is not limited thereto. The electrical connector 100 may be used to charge other batteries.

Also, although the respective arms have been described as being biased by coil springs as bias members, the present invention is not limited thereto. The respective arms may be biased by other springs, cylinders, or the like.

Also, the respective configurations of the electrical connector 100 are not limited to the description in the present embodiment, and may be any other configurations that can be implemented. For example, it is only required that the electrical connector 100 includes at least the connector case 110, the lock mechanism 120, the fitting detecting mechanism 130, the lock release unit 140, and the release switch hold portion 160. The electrical connector 100 may not include the power feedability determining mechanism 150.

As described above, the present invention naturally includes various embodiments that are not described herein. Accordingly, the technical scope of the present invention should be only determined according to the subject matter recited in the scope of claims regarded as appropriate based on the above description.

What is claimed is:

1. An electrical connector comprising:
a connector case configured to accommodate an electric wire, the connector case including a connector fitting portion configured to fit to a power receiving connector and configured to accommodate a power feeding terminal connected to the electric wire;
a lock mechanism configured to prevent the power receiving connector and the connector fitting portion from being separated from each other in the fitting state between the power receiving connector and the connector fitting portion;
a fitting detecting mechanism configured to detect the fitting state between the power receiving connector and the connector fitting portion;
a lock release unit including an operating portion advanceable from and retreatable to the connector case, and a latch portion configured to latch to a portion of the lock mechanism and a portion of the fitting detecting mechanism with the operating portion being retreated to the connector case; and
a lock-release hold portion configured to hold the operating portion of the lock release unit when the operating portion is in a state of being pressed,
wherein, upon release of the latching of the latch portion in the fitting state between the power receiving connector and the connector fitting portion, the operating portion of the lock release unit is configured to move in a direction where the operating portion advances from the connector case and become operatable to enable release of the fitting state between the power receiving connector and the connector fitting portion,
wherein the lock mechanism includes
a lock arm swingably provided in the connector case,
a lock claw provided at one end of the lock arm at a side of the power receiving connector and being protrudable and retractable from the connector fitting portion, and
a lock piece provided at the other end of the lock arm and being latchable to the latch portion of the lock release unit,
wherein the fitting detecting mechanism includes
a latch arm swingably provided in the connector case,
a latch claw provided at one end of the latch arm at a side of the power receiving connector and being protrudable and retractable from the connector fitting portion, and
a latch piece provided at the other end of the latch arm and being latchable to the latch portion of the lock release unit,
wherein the latch piece is provided on a nearer side than the lock claw in a fitting direction of the connector fitting portion to the power receiving connector, and while the latch claw is in a state of retracting into the connector fitting portion, the latch arm swings, so that the latching of the latch piece to the lock release unit is released,
wherein the lock-release hold portion includes
a hold arm swingably provided in the connector case, and
a hold latch piece provided at an end portion of the hold arm, the hold latch piece being latched to the latch portion of the lock release unit at a position where the operating portion of the lock release unit is pressed, and
wherein the latch arm includes a latch state release portion configured to release latching between the hold latch piece and the latch piece when the latch piece of the lock release unit and the latch piece latch together.

2. The electrical connector according to claim 1, wherein the lock-release hold portion further includes:
a hold arm shaft pivotably supporting the hold arm; and
a hold arm bias member biasing the hold arm toward a direction where the hold latch piece is latched to the operating portion of the lock release unit.

3. The electrical connector according to claim 1, wherein the lock mechanism includes
a lock arm shaft configured to pivotally support the lock arm to be swingable, and
a lock arm bias member configured to bias the lock arm in a direction where the lock claw protrudes from the connector fitting portion,
the fitting detecting mechanism includes
a latch arm shaft configured to pivotally support the latch arm to be swingable, and
a latch arm bias member configured to bias the latch arm in a direction where the latch claw protrudes from the connector fitting portion, and
the lock release unit includes a release bias member configured to bias the lock release unit in the direction where the operating portion advances from the connector case.

4. The electrical connector according to claim 2, wherein the lock mechanism includes
a lock arm shaft configured to pivotally support the lock arm to be swingable, and
a lock arm bias member configured to bias the lock arm in a direction where the lock claw protrudes from the connector fitting portion,
the fitting detecting mechanism includes
a latch arm shaft configured to pivotally support the latch arm to be swingable, and
a latch arm bias member configured to bias the latch arm in a direction where the latch claw protrudes from the connector fitting portion, and
the lock release unit includes a release bias member configured to bias the lock release unit in the direction where the operating portion advances from the connector case.

* * * * *